(12) United States Patent
Kameshima et al.

(10) Patent No.: US 7,724,874 B2
(45) Date of Patent: May 25, 2010

(54) RADIATION IMAGING APPARATUS, DRIVING METHOD THEREOF AND RADIATION IMAGING SYSTEM

(75) Inventors: Toshio Kameshima, Kumagaya (JP); Tadao Endo, Honjo (JP); Tomoyuki Yagi, Honjo (JP); Katsuro Takenaka, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 11/773,686

(22) Filed: Jul. 5, 2007

(65) Prior Publication Data

US 2008/0013686 A1    Jan. 17, 2008

(30) Foreign Application Priority Data

Jul. 11, 2006   (JP)   ............................. 2006-190896
Jun. 15, 2007   (JP)   ............................. 2007-158602

(51) Int. Cl.
*H05G 1/64*   (2006.01)
(52) U.S. Cl. ............... 378/98.12; 378/98.7; 250/370.09
(58) Field of Classification Search ................ 378/98.7, 378/98.8, 98.11, 98.12; 250/370.09
See application file for complete search history.

(56) References Cited

U.S. PATENT DOCUMENTS

| | | | |
|---|---|---|---|
| 6,952,015 B2 | 10/2005 | Kameshima | 250/370.11 |
| 6,952,464 B2 | 10/2005 | Endo | 378/98.11 |
| 6,985,555 B2 | 1/2006 | Endo | 378/98.11 |
| 7,002,157 B2 | 2/2006 | Kameshima | 250/370.11 |
| 7,012,260 B2 | 3/2006 | Endo | 250/370.11 |
| 7,138,639 B2 | 11/2006 | Kameshima | 250/370.11 |
| 7,154,099 B2 | 12/2006 | Endo | 250/370.11 |
| 7,227,926 B2 | 6/2007 | Kameshima et al. | 378/98.9 |
| 2005/0109927 A1 | 5/2005 | Takenaka et al. | 250/252.1 |
| 2005/0199834 A1 | 9/2005 | Takenaka et al. | 250/580 |
| 2005/0200720 A1 | 9/2005 | Kameshima et al. | 348/220.1 |
| 2005/0220269 A1 | 10/2005 | Endo et al. | 378/114 |
| 2005/0264665 A1 | 12/2005 | Endo et al. | 348/308 |
| 2006/0119719 A1 | 6/2006 | Kameshima | 348/308 |
| 2006/0192130 A1 | 8/2006 | Yagi | 250/370.14 |
| 2006/0289774 A1 | 12/2006 | Endo et al. | 250/370.09 |
| 2007/0040099 A1 | 2/2007 | Yokoyama et al. | 250/208.1 |
| 2007/0069144 A1 | 3/2007 | Kameshima | 250/370.09 |
| 2007/0080299 A1 | 4/2007 | Endo et al. | 250/370.09 |
| 2007/0096032 A1 | 5/2007 | Yagi et al. | 250/370.11 |
| 2007/0125952 A1 | 6/2007 | Endo et al. | 250/369 |

(Continued)

FOREIGN PATENT DOCUMENTS

JP    2002-301053    10/2002

*Primary Examiner*—Chih-Cheng G Kao
(74) *Attorney, Agent, or Firm*—Fitzpatrick, Cella, Harper & Scinto

(57) ABSTRACT

A memory stores first image data for offset correction generated by performing an interlace scanning of the driving lines of odd rows only in a driving circuit unit. A memory stores second image data for offset correction generated by performing the interlace scanning of the driving lines of even rows only in the driving circuit unit. A processing unit synthesizes the first image data for offset correction and the second image data for offset correction, thereby to generate image data for offset correction of one frame portion, and an arithmetic operation unit performs an arithmetic operation processing on the radiation image data by using the image data for offset correction of one frame portion synthesized and generated, thereby to perform the offset correction of the radiation image data.

13 Claims, 14 Drawing Sheets

U.S. PATENT DOCUMENTS

| | | | |
|---|---|---|---|
| 2007/0131843 A1 | 6/2007 | Yokoyama et al. | 250/205 |
| 2007/0183573 A1 | 8/2007 | Kameshima et al. | 378/98.9 |
| 2007/0210258 A1 | 9/2007 | Endo et al. | 250/370.09 |
| 2007/0290143 A1 | 12/2007 | Kameshima et al. | 250/370.09 |
| 2007/0291904 A1 | 12/2007 | Takenaka et al. | 378/207 |
| 2007/0297567 A1 | 12/2007 | Takenaka et al. | 378/98.2 |
| 2008/0011958 A1 | 1/2008 | Endo et al. | 250/370.08 |

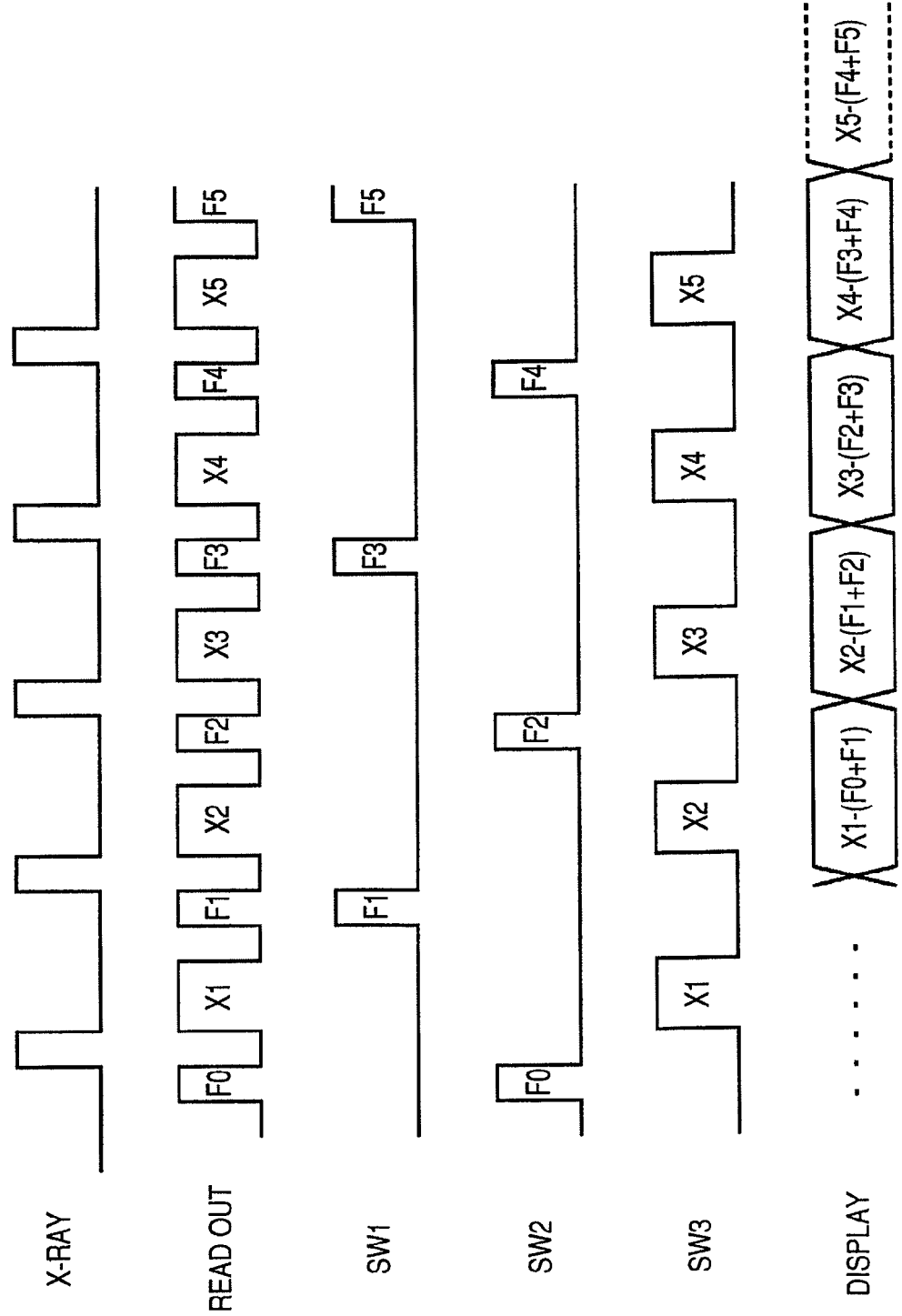

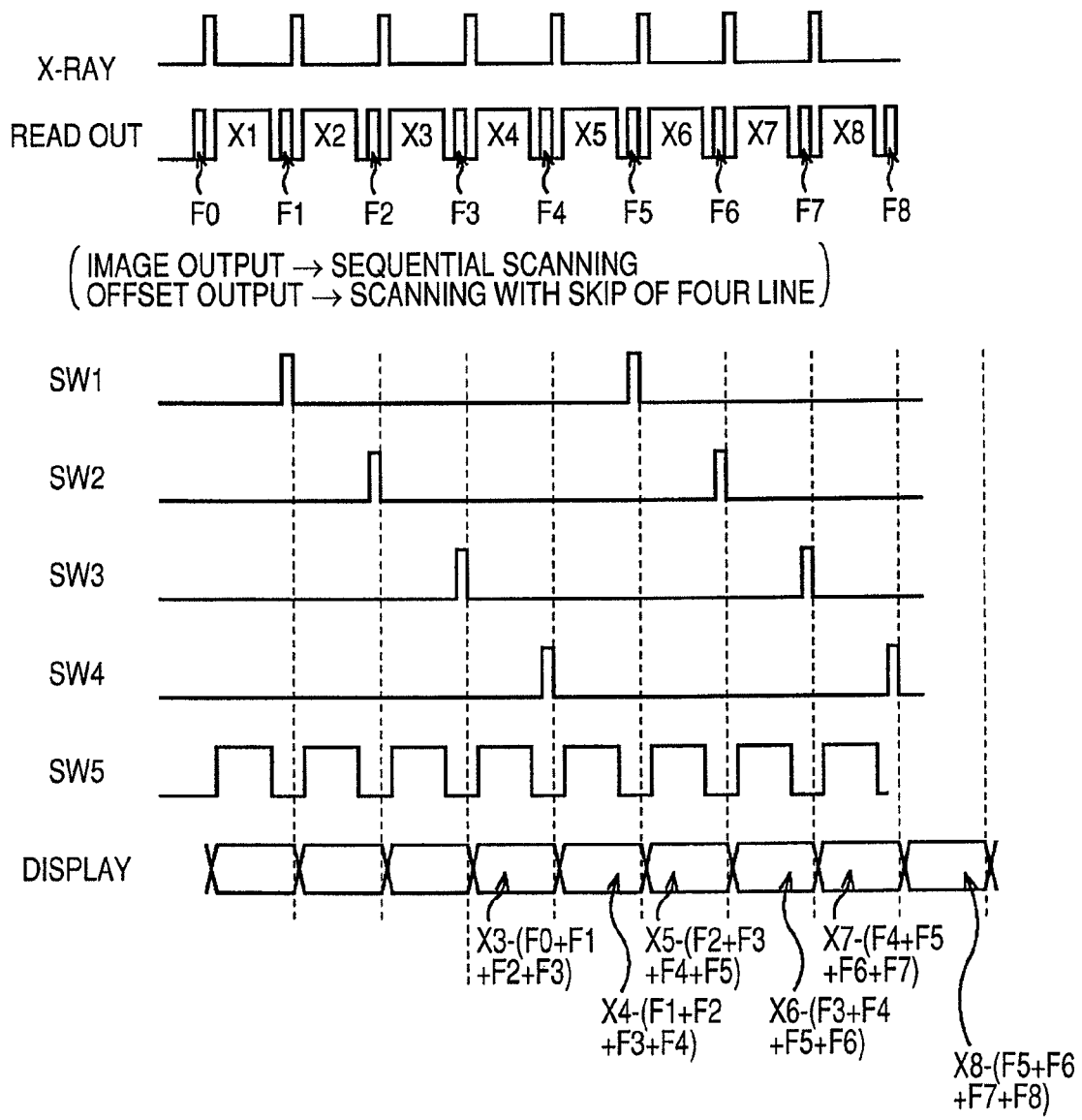

RADIATION IMAGING APPARATUS, DRIVING METHOD THEREOF AND RADIATION IMAGING SYSTEM

BACKGROUND OF THE INVENTION

1. Field of the Invention

The present invention relates to a radiation imaging apparatus for performing a so-called offset, the driving method thereof, and a radiation imaging system.

2. Description of the Related Art

In recent years, in general, there has been known a radiation imaging apparatus, which comprises a flat-type area sensor arranged with pixels in a matrix, which are composed of a conversion element and a TFT based on amorphous silicon and polysilicon on an insulating substructure such as a glass substrate. In this radiation imaging apparatus, radiation such as X-rays is converted into an electric charge, and the converted electric charge is subjected to matrix-driving by using the TFT serving as a switch element controlled by a driving control unit, so that the electric signal based on the electric charge is read, and is read out to a circuit unit.

Using such an apparatus, an object image can be obtained by the electric signal output from a read out circuit unit, but this image (electric signal output from the read out circuit unit) includes an offset component generated by the area sensor and the read out circuit unit. Since the image radiographed by actually irradiating it with the radiation includes the above-described offset component, it is necessary to perform an offset correction in order to remove the offset component from the radiographed image.

Heretofore, this offset correction has been performed by what can be broadly divided into two methods. A first offset correction method is a method of obtaining an image data for offset in advance. In this method, the electric signals based on the electric charges accumulated in the pixel in a state in which the radiation, or light based on the radiation, is not incident on the area sensor are read out by using the driving circuit unit and the read out circuit unit from the area sensor, thereby to obtain an image data FO for offset correction. The image data FO for offset correction thus obtained is stored in an image memory for offset. When the image data for offset correction is obtained in advance in this manner, it is often the case that a ROM is used for the image memory for offset.

After that, every time the radiation including the object image information or the light based on that radiation is incident, a read action is performed for the area sensor, the driving circuit unit, and the read out circuit unit. At this time, for every radiographing, a radiation image data Xn is stored in a radiation image memory. In an arithmetic operation unit, an arithmetic operation processing such as subtracting the image data FO for offset correction from the radiation image data Xn is performed, and the image data subjected to the arithmetic operation processing is displayed in a display unit such as a monitor.

In the above-described conventional example, since the image data FO for offset correction is obtained in advance, it is not necessary to obtain the image data for offset correction for each radiographing, and this is advantageous in performing a prompt radiographing. However, it is generally known that the offset component in the flat panel-type area sensor often changes due to factors such as a variance in time, variance in temperature, image lag (effect due to optical hysteresis of the preceding frame), and variance in defective pixels.

When a change occurs in the offset component of the above-described area sensor, the correction method based on the image data for offset correction stored in advance is not sufficient in terms of image quality, but often causes malfunctions. That is, in this case, the offset correction had often the opposite effect of lowering the image quality of the radiation image data.

Hence, in a second offset correction method, every time the irradiation with radiation or with light based on that radiation is performed, in other words, every time the radiation image is radiographed, both the radiation image data Xn and an image data Fn for offset correction are obtained so as to perform the offset correction. In this method, the radiation or the light based on that radiation is directed at the area sensor, and after that, the read out of a radiation image data X1 is performed, and this radiation image data X1 is stored in the radiation image memory. Subsequently, in a state in which the radiation or the light based on that radiation is not incident on the area sensor, an image data F1 for offset correction is obtained, and this image data F1 for offset correction is stored in the image memory for offset. When the content stored in the image memory for offset is rewritten every time in this manner, RAM is used for the memory.

After that, every time radiographing is performed in the operation unit, the arithmetic operation processing such as subtracting the image data Fn for offset correction from the radiation image data Xn is performed, and the image data subjected to the arithmetic operation processing is displayed in the display unit such as the monitor. For example, Japanese Patent Application Laid-Open No. 2002-301053 discloses a radiation imaging apparatus, which performs an offset correction by using the image data for offset correction obtained at the same time intervals as the output of the radiation image data during a period in which the radiation or the light based on that radiation is not irradiated.

In this second offset correction method, it is possible to prevent fluctuation of the image data for offset correction by the changes such as the above described variance in time, variance in temperature, image lag, and variance in defective pixels and avoid the lowering of the image quality of the radiation image data. However, on the other hand, in the second offset correction method, since it takes the same time as required in obtaining the radiation image data to obtain the image data for offset correction, it has been difficult to perform a prompt radiographing.

SUMMARY OF THE INVENTION

In the above-described first offset correction method, since it is not possible to correct the effects of a variance in time, variance in temperature, image lag (optical hysteresis), and variance in defective pixels, the result is a poor-quality image.

Some flat panel-type area sensors are characterized by an offset component that fluctuates with time or is affected by optical hysteresis of the preceding frame. Particularly, in this case, the fluctuation of the offset component hardly causes a problem in a still image radiographing mode, but in a fluoroscopic mode in which the radiographing for long hours at a low radiation dosage is continued, there arises a malfunction in that image data is deteriorated while the radiographing is continued.

Further, in the second offset correction method, since it takes the same time as required in obtaining the radiation image data to obtain the image data for offset correction, it has been unable to improve the rate of the continuous radiographing such as fluoroscopy.

In the second offset correction method, a substantial rate (frame rate) of radiographing is reduced by half, and there are the cases where a rate (frame rate) necessary for radiographing is not secured. The reduction in the rate of radiographing cannot be ignored when, for example, the radiographing apparatus is used for diagnosis in medical treatment, and in particular, this likely causes a large issue in the fluoroscopic radiographing of children.

That is, in the conventional radiation imaging apparatus, when the offset correction is performed, there has been a problem that it is difficult to perform a prompt radiographing without reducing the image quality of the radiation image data.

The present invention has been made in view of the above-described problem, and an object of the invention is to realize a prompt radiographing without reducing the image quality of the radiation image data when the offset correction is performed.

The radiation imaging apparatus of the present invention includes an area sensor arranged with pixels in a matrix having a conversion element for converting the incident radiation into an electric signal; a driving circuit unit applying a driving signal to a driving line and driving a plurality of the pixels connected in common to the driving line; a read out circuit unit reading out the electric signals from the pixels driven by the driving circuit unit and outputting the signals as image data; a processing unit for executing a process for producing image data for correction based on partial image data for correction, wherein the partial image data for correction is read out by the read out circuit as an electric signal from one or more of the plurality of pixels in the area sensor without the incident radiation while the one or more of the pixels are driven by the driving circuit unit and the other pixels are not driven by the driving circuit, and then outputted from the read out circuit; and an arithmetic operation unit for subjecting radiation image data to an arithmetic operation processing using the image data for correction, wherein the radiation image data is read out by the read out circuit as an electric signal from the pixels driven by the driving circuit based on the incident radiation, and then outputted from the read out circuit.

A radiation imaging system of the present invention comprises a radiation generator for generating radiation and the above-described radiation imaging apparatus, and the radiation generated by the radiation generator is incident on the area sensor.

The present invention provides a driving method of a radiation imaging apparatus, which comprises an area sensor arranged with pixels in a matrix, each pixel having a conversion element for converting incident radiation into an electric signal, a driving circuit unit for applying a driving signal to a driving line and driving a plurality of the pixels connected in common to the driving line, and a read out circuit unit reading out the electric signal from the pixel driven by the driving circuit unit and outputting the signal as image data, comprising: a step of outputting radiation image data from the read out circuit unit, wherein the radiation image data is read out by the read out circuit as an electric signal from pixels driven by a driving circuit based on the incident radiation, and then outputted from the read out circuit; a step of outputting partial image data for correction from the read out circuit unit, wherein the partial image data for correction is read out by the read out circuit as an electric signal from one or more of the plurality of pixels in the area sensor without the incident radiation while the one or more of the pixels are driven by the driving circuit unit and the other pixels are not driven by the driving circuit, and then outputted from the read out circuit; a step of generating image data for correction by using the partial image data for correction; and a step of performing an arithmetic operation processing on the radiation image data by using the image data for correction. According to the present invention, when the offset correction is performed, a prompt radiographing can be realized without lowering the image quality of the radiation image data.

Further features of the present invention will become apparent from the following description of exemplary embodiments with reference to the attached drawings.

BRIEF DESCRIPTION OF THE DRAWINGS

FIG. 4A is a timing chart illustrating a driving method of the X-ray imaging system according to the first embodiment.

FIG. 9A is a timing chart illustrating the driving method of the X-ray imaging system according to the third embodiment.

DESCRIPTION OF THE EMBODIMENTS

Hereinafter, referring to the accompanying drawings, various embodiments of the present invention will be described. Incidentally, in the various embodiments of the present invention described below, though an example is illustrated in which X-rays are used as the radiation, the radiation according to the present invention is not limited to X-rays, and includes electromagnetic waves, or beams of α-rays or β-rays, and γ-rays.

First Embodiment

Figure 1:
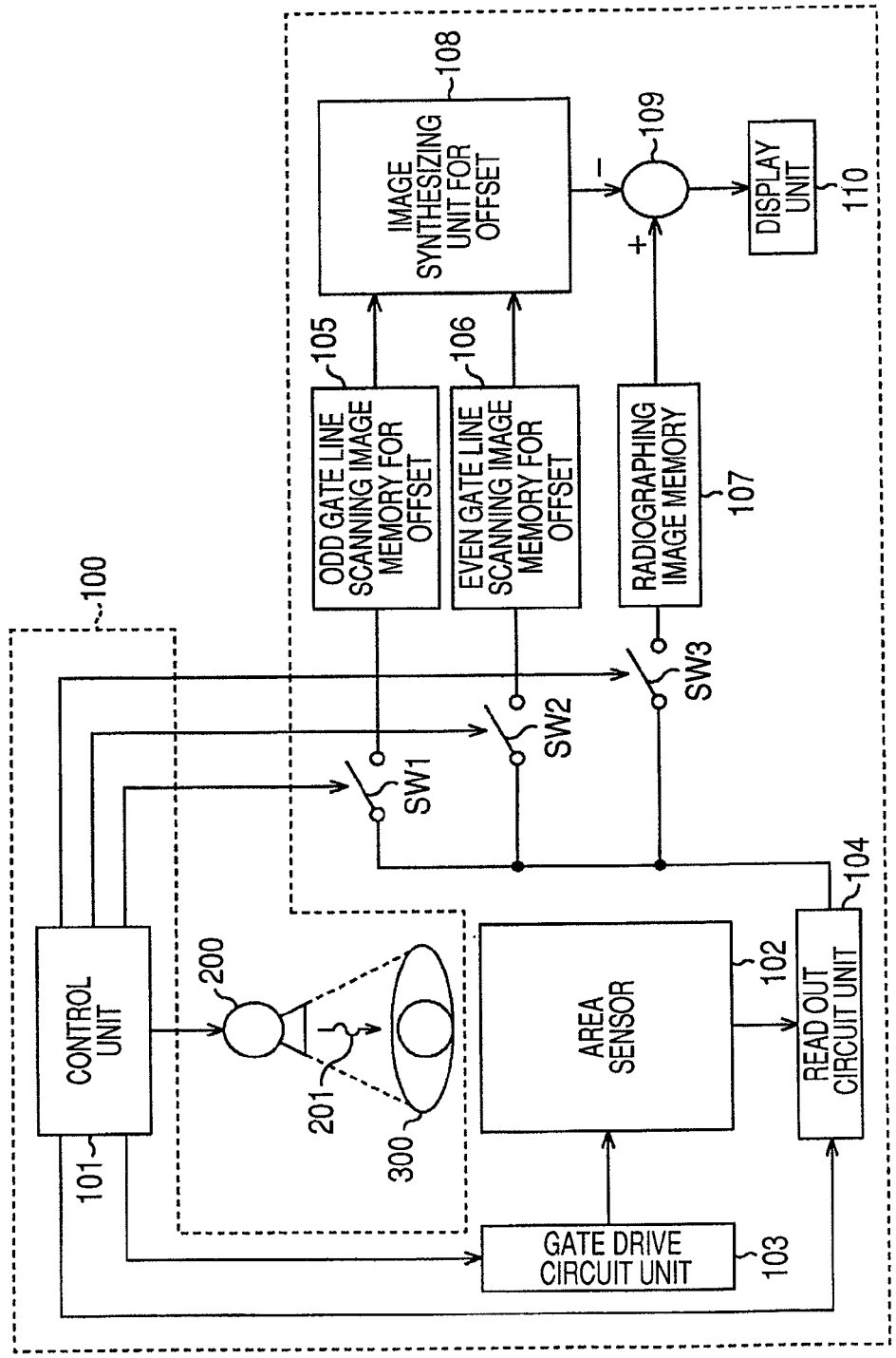
FIG. 1 is a schematic block diagram of an X-ray imaging system (radiation imaging system) according to a first embodiment.

Hereinafter, by using FIGS. 1 to 6, a first embodiment of the present invention will be described in detail. FIG. 1 is a schematic block diagram of an X-ray imaging system (radiation imaging system) according to the first embodiment. The X-ray imaging system according to the present embodiment comprises an X-ray imaging apparatus (radiation imaging apparatus) 100 and an X-ray generator (radiation generator) 200.

The X-ray imaging apparatus 100 of the present invention comprises a control unit 101, an area sensor 102, a driving circuit unit 103, a read out circuit unit 104, and a switch group comprising a first switch SW1, a second switch SW2, and a third switch SW3. Further, the X-ray imaging apparatus 100 comprises a first image memory 105 for offset, a second image memory 106 for offset, a radiation image memory 107, a processing unit 108 for synthesizing the images for offset correction, an arithmetic operation unit 109, and a display unit 110. In the present embodiment, the memories 105, 106 and 107, the processing unit 108, and the arithmetic operation unit 109 comprise an image processing unit.

The control unit 101 controls the actions of the driving circuit unit 103, the read out circuit unit 104, the first switch SW1, the second switch SW2, and the third switch SW3 as well as the X-ray generator 200. The area sensor 102 has the pixels arranged in a matrix comprising a conversion element for converting the radiation into the electric charge and a TFT which is a switch element for transferring the electric signal based on the converted electric charge. The driving circuit unit 103 is, for example, composed of shift resistors, and gives driving signals to the gate of the TFT configured inside the area sensor 102 for driving the pixels inside the area sensor 102 and performs the driving of the area sensor 102. The read out circuit unit 104 reads out the electric signal based on the electric charge generated at each conversion element from the pixels driven by the driving circuit unit 103, and outputs the signal as an image data.

The first image memory 105 for offset is a memory for storing a first image data for offset from a first pixel group inside the area sensor 102 selected and partially driven by the driving circuit unit 103. In the present embodiment, for example, it is a memory for storing the image data for offset correction for odd row portions obtained by performing an interlace scanning for selecting and partially scanning the driving lines of odd rows only by the driving circuit unit 103. The second image memory 106 for offset is a memory for storing the image data for offset from a second image group different from the first pixel group inside the area sensor 102 selected and driven by the driving circuit unit 103. In the present embodiment, for example, it is a memory for storing the image data for offset correction for even row portions obtained by performing the interlace scanning for selecting and partially scanning even row gates only by the driving circuit unit 103. Here, the first image data for offset correction and the second image data for offset correction are the partial image data for offset correction obtained based on the electric signals based on the electric charges accumulated in the pixels in a state in which X-rays 201 from the X-ray generator 200 are not incident on the area sensor 102.

The radiation image memory 107 is a memory for storing the image data (radiation image data) radiographed corresponding to the X-rays 201 irradiated on the area sensor 102 from the X-ray generator 200 after being transmitted through an object 300.

The first switch SW1 is a switch for managing the connection between the read out circuit unit 104 and the first image memory 105 for offset. The second switch SW2 is a switch for managing the connection between the read out circuit unit 104 and the image memory 106 for offset. The third switch SW3 is a switch for managing the connection between the read out circuit unit 104 and the radiation image memory 107.

The processing unit 108 performs a processing for generating the image data for offset correction for one image (one frame) portion by using the first image data for offset correction stored in the first image memory 105 for offset and the second image data for offset correction stored in the second image memory 106 for offset. In the present embodiment, the processing unit 108 synthesizes the first image data for offset correction and the second image data for offset correction, thereby to generate the image data for offset correction for one image (one frame) portion. The arithmetic operation unit 109 inputs the radiation image data of the radiation image memory 107 and the image data for offset correction generated by the processing unit 108, thereby to perform the arithmetic operation processing such as a subtraction. The display unit 110 is, for example, a display medium such as a monitor to display the image data subjected to the arithmetic operation processing by the arithmetic operation unit 109.

Figure 2:
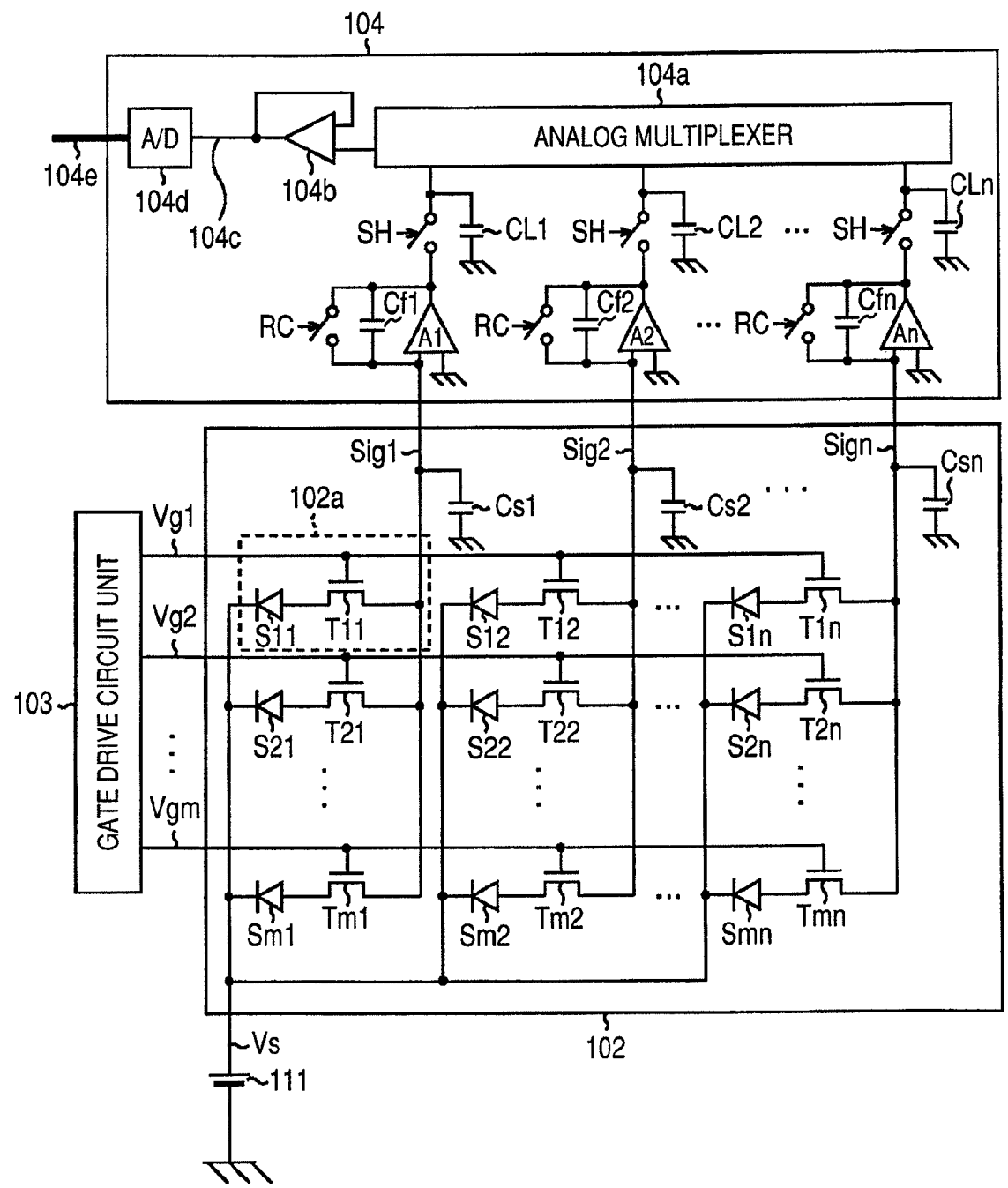
FIG. 2 is a schematic illustration illustrating the detailed configuration of an area sensor and a read out circuit unit of the X-ray imaging system according to the first embodiment.

Next, detailed configurations of the area sensor 102 and the read out circuit unit 104 will be described. FIG. 2 is a schematic illustration illustrating the detailed configurations of the area sensor and the read out circuit unit of an X-ray imaging system according to the first embodiment. Incidentally, a power source 111 illustrated in FIG. 2 is, for example, configured in the control unit 101.

The area sensor 102 and the driving circuit unit 103 are connected through m pieces (m is a positive integer) of driving lines Vg1 to Vgm. Further, the area sensor 102 and the read out circuit unit 104 are connected through n signal lines Sig1 to Sign (where n is a positive integer).

The area sensor 102 is arranged with pixels 102a in a matrix comprising one piece each of conversion elements S11 to Smn composed of a PIN type photodiode and switch elements T11 to Tmn including a photoelectric conversion element composed of a thin film transistor (TFT). That is, the area sensor 102 is provided with m×n pieces of the pixels 102a. This area sensor 102 is a flat panel-type area sensor, for example, composed of amorphous silicon as a main material on a glass substrate. The area sensor 102 further comprises a wavelength converter (not illustrated) such as a phosphor for wavelength-converting the radiation into light to which a photoelectric conversion element is sensitive. In the present embodiment, the wavelength converter and the photoelectric conversion element serve as a conversion element for converting the radiation into the electric signal.

A common electrode side (cathode side of the photodiode in FIG. 2) in the conversion element of each pixel 102a is applied with a bias voltage from a power source 111 through a bias line Vs. Further, the switch element of each pixel 102a lined up in the row direction of the area sensor 102 has its gate electrode (control electrode) electrically connected in common to the driving lines Vg1 to Vgm, for example, per row unit. Further, the switch element of each pixel 102a lined up in the column direction of the area sensor 102 has a source electrode which is one electrode of the main electrodes electrically connected in common to the signal lines Sig1 to Sign, for example, per column unit. Further, the switch element has a drain electrode which is the other electrode of the main electrodes electrically connected to the conversion element per each pixel.

The read out circuit unit 104 amplifies the electric signals parallel-output per each row from each pixel 102a through the signal lines Sig1 to Sign, and series-converts them to be output as the image data (digital data). The read out circuit unit 104 comprises amplifiers A1 to An provided with capacitors Cf1 to Cfn and switches between input/output terminals, respectively, and sample hold circuit units composed of switches and capacitors CL1 to CLn for each of the signal lines Sig1 to Sign. Further, the read out circuit unit 104 comprises an analogue multiplexer 104a, a buffer amplifier 104b, and an A/D converter 104d.

The analogue signal serial-converted by the amplifiers A1 to An, the analogue multiplexer 104a, and the buffer amplifier 104*b* is input to the A/D converter 104*d* through an analogue data line 104*c*. In the A/D converter 104*d*, the input analogue signal is converted into a digital signal, thereby to output the image data (digital data) through a digital output bus 104*e*. After that, the image data output from the read out circuit unit 104 is processed in the image processing unit (not illustrated) composed of, for example, a memory and a processor, and is displayed in the display unit 110 or stored in a recording medium such as a hard disc.

Figure 3:
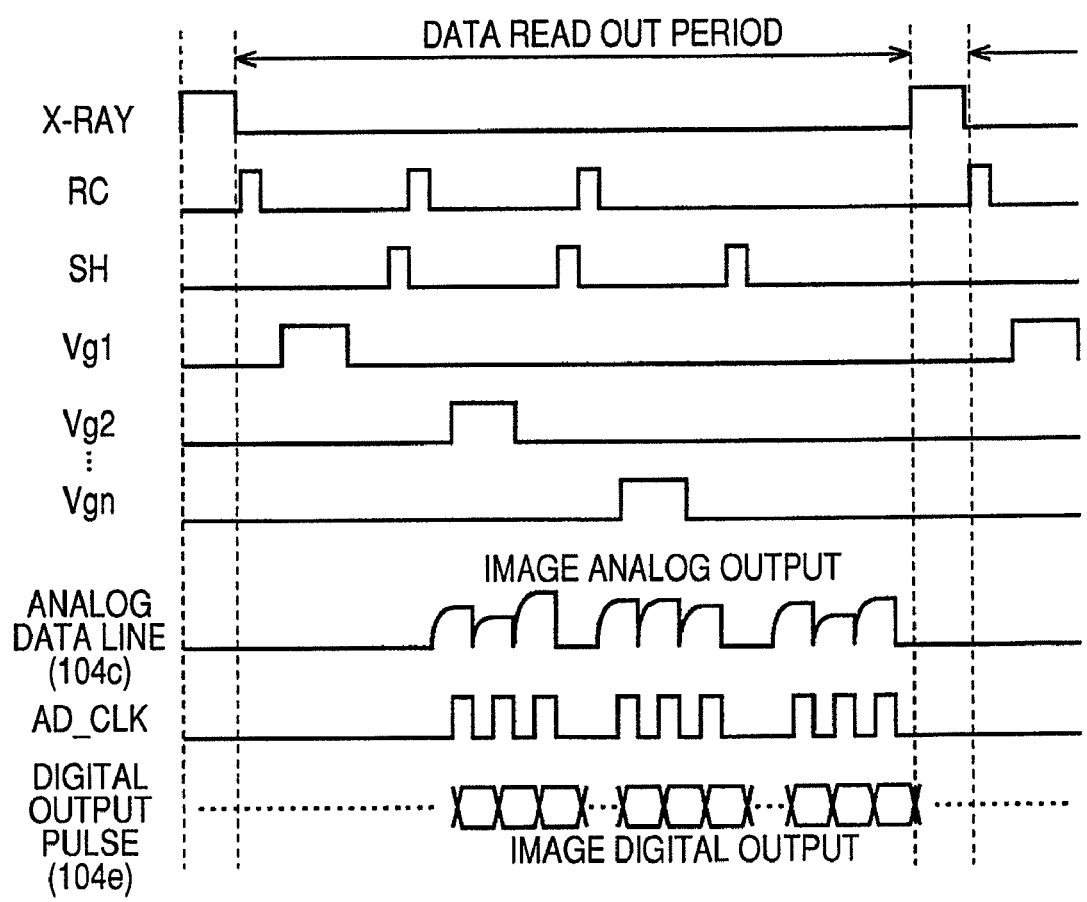
FIG. 3 is a timing chart illustrating one example of the driving method of the area sensor.

Next, the driving method of the area sensor 102 will be described. FIG. 3 is a timing chart illustrating one example of the driving method of the area sensor 102.

When the X-rays 201 are irradiated from the X-ray generator 200 by a control from the control unit 101, each of the conversion elements S11 to Smn of the area sensor 102 generates an electric charge based on the incident X-rays 201, and accumulates the electric charge in each pixel 102*a*. Further, by a reset signal RC from the control unit 101, a reset switch provided in each of the amplifiers A1 to An is turned on, and each of integral capacitors Cf1 to Cfn of each of the amplifiers A1 to An and each of the signal lines Sig1 to Sign are reset.

Subsequently, a pulse (driving signal) is applied to the driving line Vg1 from the driving circuit unit 103, and the switch elements T11 to T1*n* of the first row connected to the driving line Vg1 are turned on. As a result, the electric charges of the conversion elements S11 to S1*n* of the first row are transferred to the read out circuit unit 104 as electric signals through the signal lines Sig1 to Sign.

The electric signals transferred to the read out circuit unit 104 are converted into voltages by the amplifiers A1 to An connected to each of the signal lines Sig1 to Sign. Subsequently, a sample hold signal SH is applied from the control unit 101, and the outputs from the amplifiers A1 to An are sample-held in the capacitors CL1 to CLn through the switches. After that, the voltages held in the capacitors CL1 to CLn with the switches put into a non-conductive state synchronize with a clock MUX_CLK from the control unit 101 so as to be serial-converted by the analog multiplexer 104*a*, and are input to the A/D converter 104*d* as the analogue signals through the buffer amplifier 104*b*. The analogue signals input to the A/D converter 104*b* synchronize with a clock A/D_CLK from the control unit 101 so as to be A/D converted, and are output as the image data (digital data) according to the resolution of the A/D converter 104*d*.

Figure 4B:
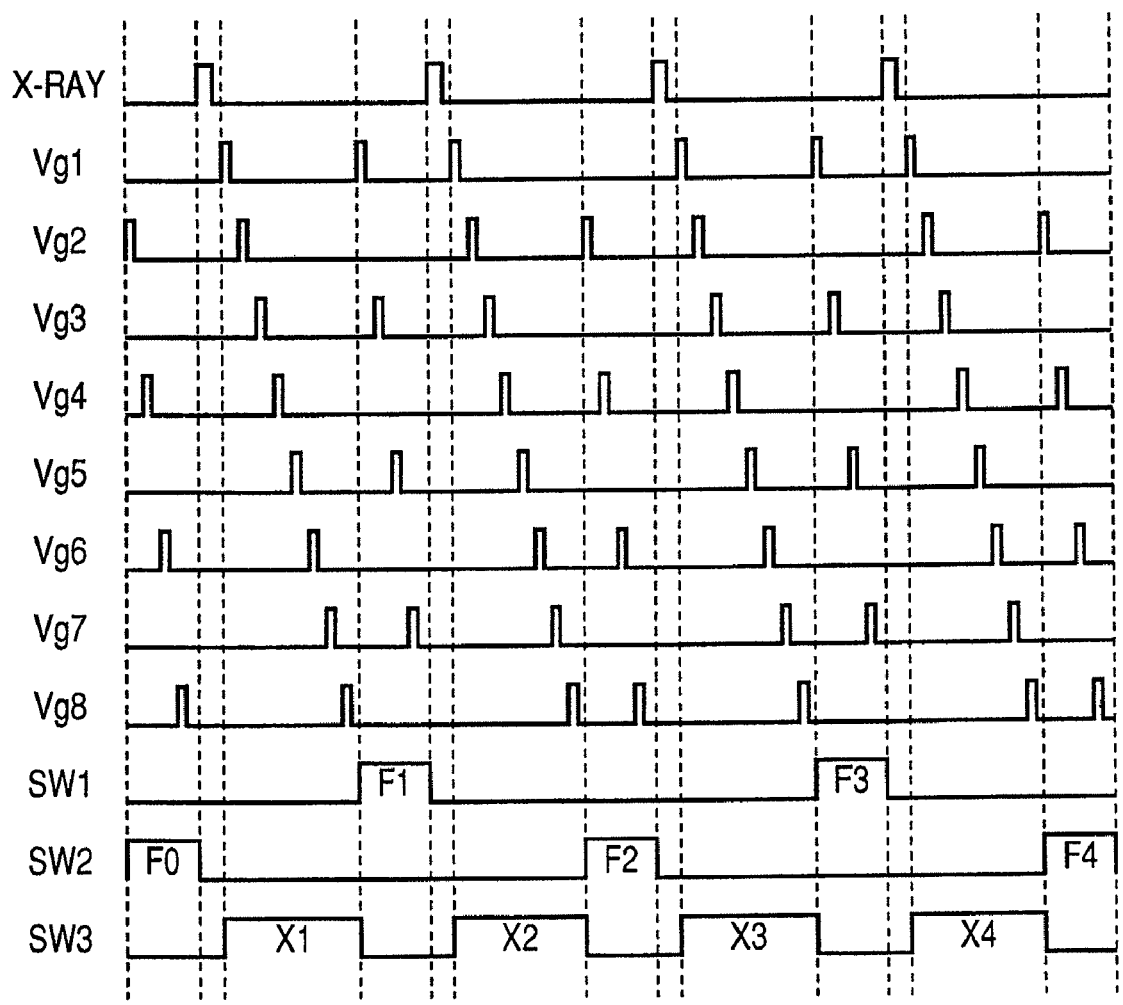
FIG. 4B is a timing chart illustrating the driving method of the X-ray imaging system according to the first embodiment.

Subsequently, each of the integral capacitors Cf1 to Cfn of each of the amplifiers A1 to An and each of the signal lines Sig1 to Sign are reset again by the RC signal. After that, a pulse (driving signal) is applied to the driving line Vg2 from the driving circuit unit 103, and the electric charges of the conversion elements S21 to S2*n* of a second row are read out to the read out circuit unit 104 through the switch elements T21 to T2*n* of the second row. In the like manner, from the driving circuit unit 103, a pulse (driving signal) is applied to the driving lines of the third row onward, so that the electric charges generated from the third conversion element onward are read out to the read out circuit unit 104 as the electric signals. As a result, the electric charges of the whole area sensor 102, that is, the image signal of one image (one frame) portion is read out to the read out circuit unit 104. The image signal of the read out one image (one frame) portion is output in order as described above from the read out circuit, so that the radiation image data (digital data) of one image (one frame) portion is obtained. Next, the driving method of the X-ray imaging system according to the first embodiment will be described. FIGS. 4A and 4B are timing charts illustrating the driving method of the X-ray imaging system according to the first embodiment. Here, FIG. 4A illustrates an outline of the driving method of the X-ray imaging system according to the first embodiment, and FIG. 4B illustrates in detail the driving method of the X-ray imaging system according to the first embodiment with attention paid to the scanning of the driving line of the driving circuit unit 103.

First, the timing chart illustrated in FIG. 4(A) will be described. In FIG. 4A are illustrated, in order from above, the X-ray irradiation from the X-ray generator 200, the read out at the read out circuit unit 104, each action of the first switch SW1 to the third switch SW3, and each timing of display of an image in a display unit 110.

Subsequently, when the X-rays illustrated in FIG. 4A are irradiated, the control unit 101, as described in FIGS. 2 and 3, controls the driving circuit unit 103, and scans all the driving lines Vg1 to Vgm in order. As a result, from the read out circuit unit 104, a radiation image data X1 of one frame portion of the whole area sensor 102 including the image data of the object 300 is output. At this time, the control unit 101 performs a control to turn on the third switch SW3, thereby to store this radiation image data X1 in the radiation image memory 107.

Subsequently, after the radiation image data X1 is output from the read out circuit unit 104, the control unit 101 controls the driving circuit unit 103, thereby to obtain the first image data for offset from a first pixel group inside the area sensor 102. In the present embodiment, the interlace scanning for driving the driving lines of the odd rows (driving line group of the odd rows) only is performed. As a result, from the read out circuit unit 104, the image data based on the electric charges generated by a plurality of conversion elements of the pixels of the odd rows which are the first pixel group is output as a first image data F1 for offset correction. At this time, the control unit 101 performs a control to turn on the first switch SW1, thereby to store the first image data F1 for offset correction in the first image memory 105 for offset. This first image data F1 for offset correction includes a variable factor of the offset output of the first pixel group and a component such as the image lag due to X-ray irradiation hysteresis.

Further, the second image memory 106 for offset is already stored with a second image data FO for offset correction given the interlace scanning for driving the driving lines of the even rows (driving line group of the even rows) only which are the second image group and output from the read out circuit unit 104. This second image data FO for offset correction is output from the read out circuit unit 104 before the radiation image data X1 is output from the read out circuit unit 104.

The processing unit 108 synthesizes the first image data F1 for offset correction and the second image data FO for offset correction stored in each of the memories 105 and 106, thereby to generate image data (FO+F1) for offset correction of one image portion (one frame portion). This image data for offset correction of one image portion (one frame portion) is equivalent to an image data for offset correction for the whole area sensor 102. This image data for offset correction includes a variance in time and a image lag component of the offset output of the area sensor 102.

Here, the processing unit 108, when synthesizing the first image data F1 for offset correction and the second image data FO for offset correction, may apply a specific coefficient on both or one of the data.

After that, in the arithmetic operation unit 109, the radiation image data X1 is subjected to the arithmetic operation processing by using the above described image data for offset correction (FO+F1) (in the present embodiment, subtracting processing is performed), and the image data subjected to the arithmetic operation processing is displayed in the display unit 110.

As a result, the image data displayed in the display unit 110 has the offset component subtracted, and good radiation image data with no lowering in the image quality can be obtained. Further, in the present embodiment, the first image data for offset correction during the radiation image data X1 is obtained by performing the interlace scanning of the driving lines of the odd rows without performing the scanning of the driving lines of all the rows. In like manner, the second image data for offset correction is obtained by performing the interlace scanning of the driving lines of the even rows without performing the scanning of the driving lines of all the rows. As a result, as compared to the conventional example of Japanese Patent Application Laid-Open No. 2002-301053, the time required for the acquisition of the first image data for offset correction or the second image data for offset correction performed during the radiation image data X1 is shortened by ½, and the speeding up of the driving can be also realized. In general, it is known that the offset fluctuation and the effect of the image lag are generated at relatively low frequencies. Hence, the acquisition of the image data for offset correction is performed by being divided and split into a plurality of pixel groups, for example, the acquisition is performed by being split into the interlace scanning of the driving lines of odd rows and the interlace scanning of the driving lines of even rows, and realistically, posing no actual problem.

Subsequently, when the X-rays are again irradiated, as described in FIGS. 2 and 3, all the driving lines Vg1 to Vgm are scanned anew in order by a control from the control unit 101. As a result, radiation image data X2 of one frame portion of the whole area sensor 102 including the image data of the object 300 is output from the read out circuit unit 104. At this time, the control unit 101 performs a control to turn on the third switch SW3, thereby to store this radiation image data X2 in the radiation image memory 107.

Subsequently, after the radiation image data X2 is output from the read out circuit unit 104, the control unit 101 controls the driving circuit unit 103, thereby to obtain the second image data for offset from the second pixel group inside the area sensor 102. In the present embodiment, the interlace scanning for driving the driving lines of even rows only is performed. As a result, from the read out circuit unit 104, the image data based on the electric charges generated at the conversion elements of the plurality of pixels of even rows which are the second pixel group is output as a second image data F2 for offset correction. At this time, the control unit 101 performs a control to turn on the second switch SW2, thereby to store this second image data F2 for offset correction in the second image memory 106 for offset.

The processing unit synthesizes the first image data F1 for offset correction and the second image data F2 for offset correction stored in each of the memories 105 and 106, thereby to renew the image data (F1+F2) for offset correction for one image portion (one frame portion). After that, in the arithmetic operation unit 109, by using the renewed image data (F1+F2) for offset correction for one image portion (one frame portion), the radiation image data X2 is subjected to the arithmetic operation processing, and the image data after the arithmetic operation processing is displayed in a display unit 110 such as a monitor.

After that, in like manner, the acquisition of the radiation image data X3, X4 and X5 is performed, and the offset correction of each of these sets of radiation image data is performed.

Next, by using FIG. 4B, the scanning of the driving lines to be performed in the present embodiment will be described further in detail. Incidentally, in FIG. 4B, the action of the read out circuit unit 104 is omitted since the focus is on the action in the driving circuit unit 103 and the actions in each of the switches Sw1, SW2, and SW3.

In FIG. 4B is illustrated the case where the driving lines connected to the driving circuit unit 103 are eight in number, Vg1 to Vg8. However, this is an expediency to make the drawing relatively simple, and in reality, far more than eight driving lines are provided.

As illustrated in FIG. 4B, in the present embodiment, when the second image data for offset correction F0, F2, F4, . . . is obtained from the pixels of even rows which are the second pixel group, the interlace scanning for partially selecting and driving the driving line only of each even row is performed. The second image data for offset correction at this time with the second switch SW2 turned on is stored in the second image memory 106 for offset, which comprises the RAM and the like. Further, when the first image data for offset correction F1, F3, F5, . . . from the pixels of odd rows which are the first pixel group is obtained, the interlace scanning for partially selecting and driving the driving line only of each odd row is performed. The first image data for offset correction at this time with the first switch SW1 turned on is stored in the first image memory 105 for offset correction, which comprises the RAM and the like.

According to the above described description, though the arithmetic operation unit 109 is supposed to perform the arithmetic operation processing only, the function of the arithmetic operation unit 109 is not limited to this, and can be further configured to perform complicated arithmetic operation processing such as a sensitivity correction.

In the present embodiment, the second image data for offset correction F0, F2, F4, . . . obtained by the scanning of the driving lines of even rows and the first image data for offset correction F1, F3, F5, . . . obtained by the scanning of the driving lines of odd rows are different, to be exact, in storage time. In this case, the offset component by cumulative dosage of dark current sometimes varies. Considering this point, when the image data for offset correction for one image (one frame) portion is generated in the processing unit 108, it is preferable to perform the processing of correcting the storage time of the first image data for offset correction and the second image data for offset correction. This processing of correcting the storage time is preferably performed to align with the storage time of the radiation image data X1. As this processing, to perform the correction of the storage time by applying a specific coefficient, for example, to both or either of them is conceivable. Further, when the storage time between each driving line (per each row) is different, the processing is preferably performed to correct the different storage time per row unit. In general, when the radiographing is performed at a high speed such as 30 fps similarly to the fluoroscopic radiographing, a difference between the storage time in the acquisition of the first image data for offset correction or the second image data for offset correction and the storage time in the acquisition of the radiation image data often does not cause a problem.

Figure 5:
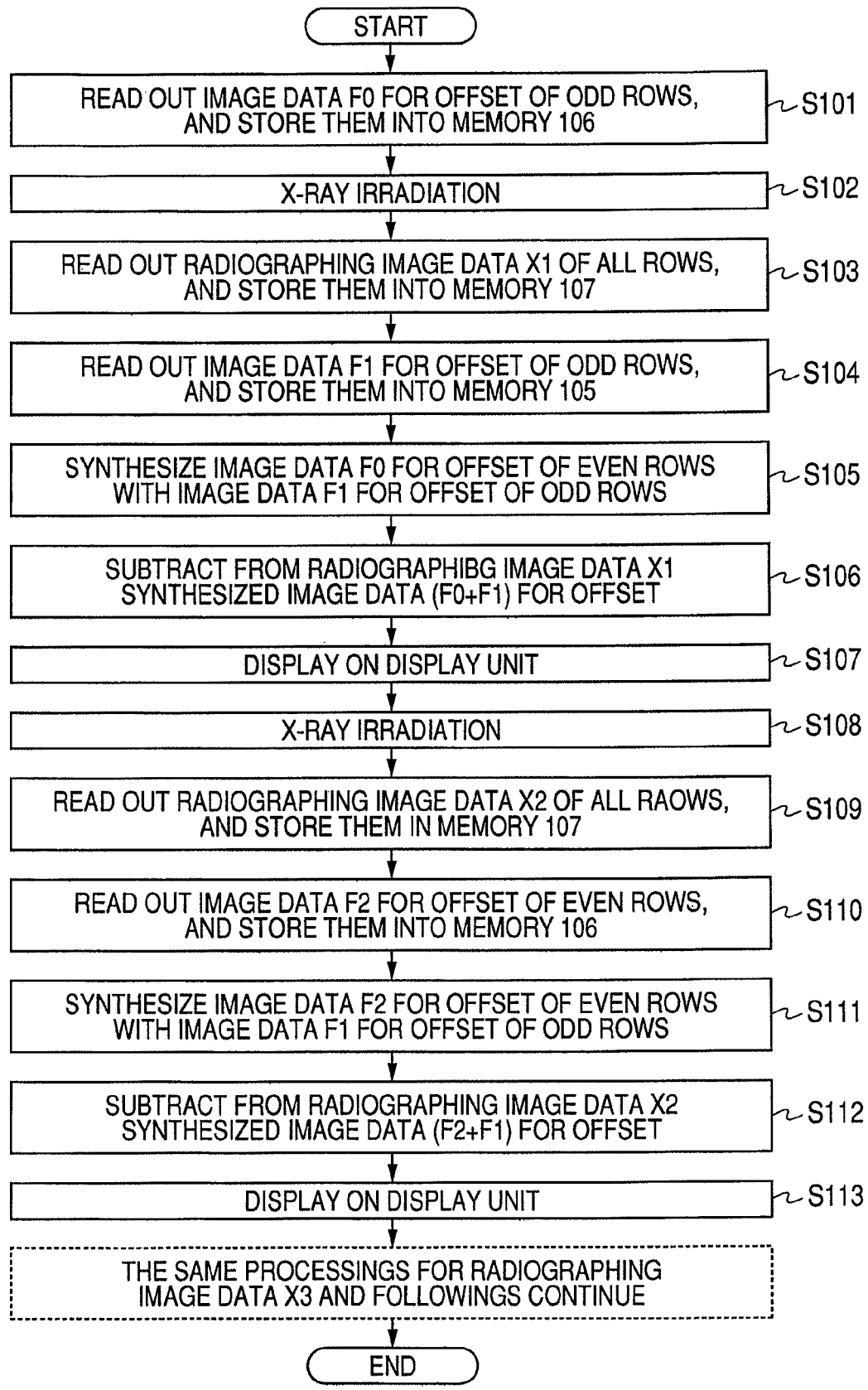
FIG. 5 is a flow chart illustrating the driving method of the X-ray imaging system according to the first embodiment.

FIG. 5 is a flowchart illustrating the driving method of the X-ray imaging system according to the first embodiment. The processing illustrated in this FIG. 5 is performed under a control from the control unit 101.

First, at step S101, to read out the electric signals based on the electric charges accumulated in the pixel 102a in a state in which the radiation or the light based on that radiation is not incident on the area sensor 102, the interlace scanning for driving the driving lines only of even rows which are the second pixel group is performed. By this interlace scanning, the second image data FO for offset correction is output from the read out circuit unit 104, and this is stored in the second image memory 106 for offset.

Subsequently, at step S102, the X-rays 201 are radiated from the X-ray generator 200.

Subsequently, at step S103, as described in FIGS. 2 and 3, all the driving lines are scanned, thereby to output the radiation image data X1 from the read out circuit unit 104, and this is stored in the radiation image memory 107.

Subsequently, at step S104, to read out the electric signals based on the electric charges accumulated in the pixel 102a in a state in which the radiation or the light based on that radiation is not incident on the area sensor 102, the interlace scanning for driving the driving lines only of odd rows which are the first pixel group. By this interlace scanning, the first image data F1 for offset correction is output from the read out circuit unit 104, and this is stored in the first image memory 105 for offset.

At step S105, the first image data F1 for offset correction and the second image data FO for offset correction stored in the memories 105 and 106 are synthesized by the processing unit, thereby to generate the image data (F0+F1) for offset correction for one image (one frame) portion.

At step S106, in the arithmetic operation unit 109, a subtraction processing for subtracting the image data (FO+F1) for offset correction for one frame portion generated at step S105 from the radiation image data X1 is performed.

Subsequently, at step S107, the radiation image data X1 subjected to the subtraction processing at step S106 is displayed in the display unit 110.

Subsequently, at step S108, the X-rays 201 are irradiated again from the X-ray generator 200.

Subsequently, at step S109, all the driving lines are scanned similarly to step S103, thereby to output the radiation image data X2 from the read out circuit unit 104, and this is stored in the radiation image memory 107.

At step S110, similarly to step S101, to read out the electric signals based on the electric charges accumulated in the pixel 102a in a state in which the radiation or the light based on that radiation is not incident on the area sensor 102, the interlace scanning for driving the driving lines only of even rows which are the second pixel group is performed. By this interlace scanning, the second image data F2 for offset correction is output from the read out circuit unit 104, and this is stored in the second image memory 106 for offset.

At step S111, similarly to step S105, the first image data F1 for offset correction and the second image data F2 for offset correction are synthesized in the processing unit 108, and the image data (F1+F2) for offset correction for one image (one frame) portion is generated.

Subsequently, at step S112, similarly to step S106, in the arithmetic operation unit 109, a subtraction processing for subtracting the image data (F1+F2) for offset correction for one image (one frame) portion generated at step S111 from the radiation image data X2 is performed.

Subsequently, at step S113, the radiation image data X2 subjected to the subtraction processing at step S112 is displayed in the display unit 110.

Hereinafter, with respect to the radiation image data X3 onward, the same processing as in steps S101 to S113 is approximately repeated.

Figure 6:
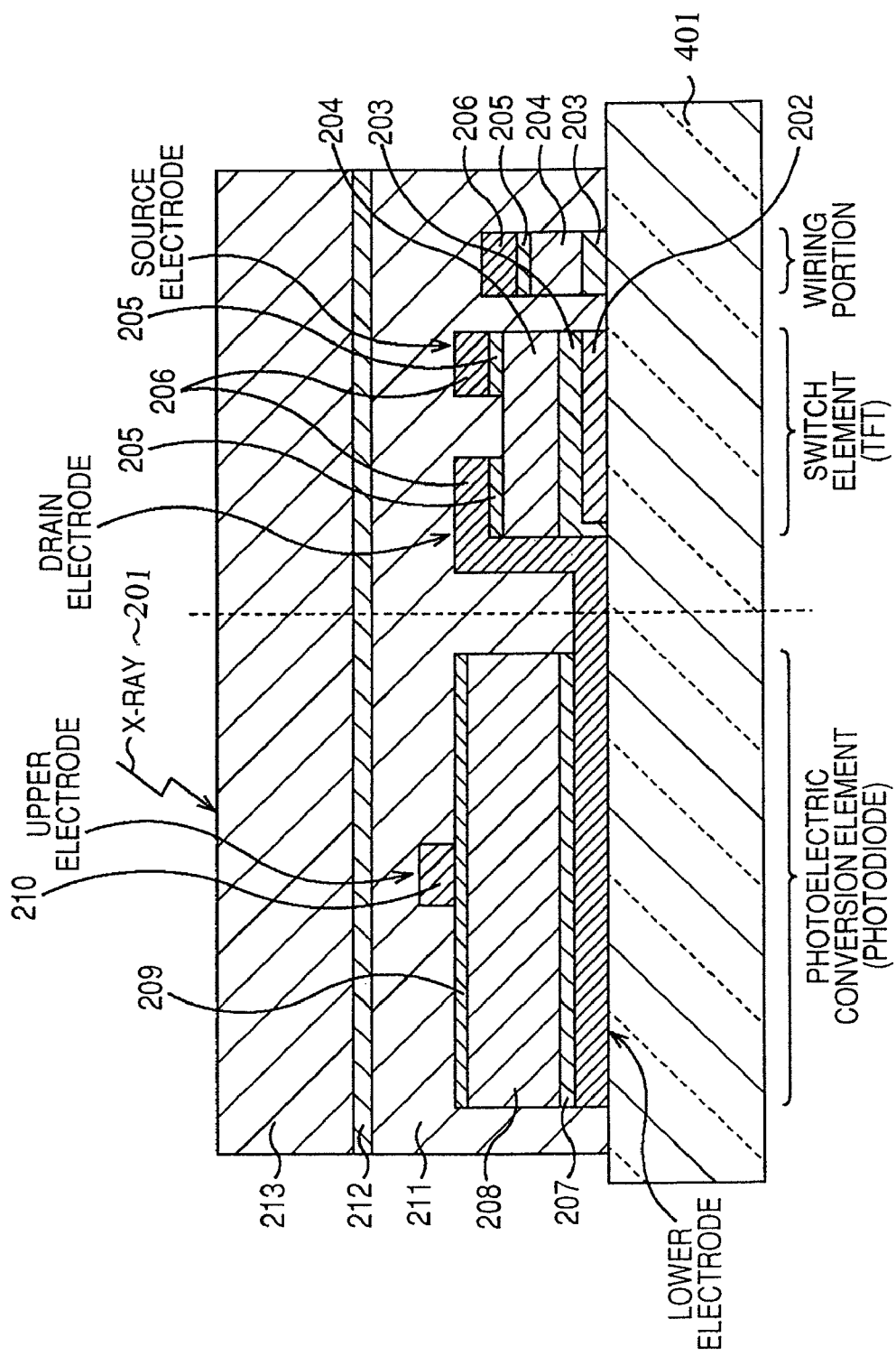
FIG. 6 is a schematic sectional view of the pixel comprising the area sensor in the X-ray imaging system according to the first embodiment.

Next, the structure of the pixel 102a comprising the area sensor 102 will be described. In the present embodiment, as the area sensor, a flat panel-type area sensor is used. FIG. 6 is a schematic sectional view of the pixel 102a comprising the area sensor 102 in the X-ray imaging system according to the first embodiment.

As illustrated in FIG. 6, the pixel 102a comprises a first conductive layer 202, an insulating layer 203, a semiconductor layer 204, an n-type semiconductor layer 205, and a second conductive layer 206 formed in order on an insulating substrate such as a glass substrate 201. Further, on the second conductive layer 206, a p-type semiconductor layer 207, a semiconductor layer 208, an n-type semiconductor layer 209, a third conductive layer 210 and a protective layer 211 are formed in order. Further, on the protective layer 211, a phosphor layer (wavelength converter) 213 is arranged through an adhesive layer 212. Here, the semiconductor layer 204, the n-type semiconductor layer 205, the p-type semiconductor layer 207, the semiconductor layer 208, and an n-type semiconductor layer 209 are formed, for example, by amorphous silicon as main materials. Further, the insulating layer 203 is, for example, formed by amorphous silicon nitride film. Further, the protective layer 211 is formed by an organic insulating film such as amorphous silicon nitride film, amorphous silicon oxide film, and polyimide.

The photoelectric conversion element of a PIN type structure comprising the conversion elements S11 to Smn comprises a lower electrode composed of the second conductive layer 206, an upper electrode composed of the third conductive layer 210, and the p-type semiconductor layer 207, the semiconductor layer 208, and the n-type semiconductor layer 209 provided between these electrodes.

The switch elements T11 to Tmn comprises a gate electrode composed of the first conductive layer 202, a source electrode or a drain electrode composed of the second conductive layer 206, and the insulating layer 203, the semiconductor layer 204, and the n-type semiconductor layer 205 provided between the gate electrode and the source or drain electrode.

Further, a wiring portion in the pixel 102a comprises the insulating layer 203, the semiconductor layer 204, the n-type semiconductor layer 205, and the second conductive layer 206 being laminated in that order on the glass substrate 201.

In FIG. 6, since an example is illustrated in which the X-ray imaging apparatus is configured, the phosphor layer 213 is arranged on the protective layer 211 through the adhesive layer 212. In general, the photoelectric conversion element composed of amorphous silicon is hardly perceptible to the X-rays. Hence, on the protective layer 211, the phosphor layer 213 which is the wavelength converter for converting the X-rays into visible light is provided through the adhesive layer 212. In this case, as the phosphor layer 213, for example, gadolinium system or CsI (cesium iodide) is grown in a cylindrical form and used. That is, in this case, a conversion element is configured in which the radiation is converted into the electric charge by the phosphor layer 213, which is the wavelength converter and the photoelectric conversion element.

In the pixel illustrated in FIG. 6, the X-rays 201 transmitted through the object 300 are incident on the phosphor layer 213, and are converted into visible light in the phosphor layer 213. Then, the converted visible light enters the photoelectric conversion element. The electric signals based on the electric charges generated at the semiconductor layer 208 of the photoelectric conversion element are transferred in order to the read out circuit unit 104 by the switch element (TFT), and are read out.

According to the first embodiment, the offset correction for reducing the offset component by the variance in time, variance in temperature, image lag, variance in the defective pixel, and the like can be performed. As a result, the deterioration of the image quality of the radiation image data by the offset component can be inhibited. Further, according to the first embodiment, the scanning of all the rows is not performed every one time radiographing of the object is performed, but the first pixel group inside the area sensor 102, for example, the pixel group of odd rows is selected, and is partially scanned. Further, according to the first embodiment, the second pixel group inside the area sensor 102, for example, the pixel group of even rows is selected, and is partially scanned. As a result, a partial image data for offset correction required for image data for offset correction is obtained by splitting. Hence, the time required for the acquisition of the image data for offset correction performed by one time radiographing of the object, as compared to the conventional example disclosed in Japanese patent application Laid-Open No. 2002-301053, can be shortened by ½. Therefore, the speeding up of the radiographing can be also realized. A prompt radiographing can be realized. Incidentally, in the present embodiment, though the first pixel group is taken as a plurality of pixels of odd rows, and the second pix group is taken as a plurality of pixels of even rows, the present invention is not limited to this. During the acquisition of the consecutive radiation image data, the image data for partial offset correction for generating the image data for offset correction may be obtained from the pixels included in the pixel group selected and partially driven by the drive circuit 103. For example, a plurality of pixels inside the area sensor is divided into the upper and lower pixel groups, and the upper half may be taken as a first pixel group, and the lower half as a second pixel group. Further, the plurality of pixels inside the area sensor may be divided into four groups of the upper and lower and left and right groups. However, when the groups of pixels are divided such that the pixels inside the pixel groups are concentrated in the massed areas such as the upper and lower areas and the left and right areas, the step of the pixel with the other pixel group becomes conspicuous. For this reason, the groups of the pixels are preferably divided such that the arrangement of the pixels inside a pixel group every odd row and every even row is dispersed.

Further, in the present invention, though the processing unit 108 performs the synthesis of the first image data for offset correction and the second image data for offset correction, the present invention is not limited to this. The processing for generating the image data for offset correction of one image (one frame) portion may be performed by using the first image data for offset correction which is a first partial image data for correction. Alternatively, the processing for generating the image data for offset correction of one image (one frame) portion may be performed by using the second image data for offset correction which is a second partial image data for offset correction. For example, the processing unit 108 may generate the image data for offset correction of one image (one frame) portion by subjecting the first or second image data for offset correction to interpolation processing. Here, the interpolation processing means performing a processing in which, for example, when the first image data for offset correction is obtained from the pixels of odd rows, the image data corresponding to the pixels of the second line is replaced by the image data corresponding to the pixels of the first line. Further, it means performing a processing in which the data of the first line and the data of the third line are averaged, thereby to be used as the image data of the second line. When the processing unit 108 capable of performing such interpolation processing is used, the image data for offset may be enough to be one, thereby allowing the memory to be reduced.

Second Embodiment

Hereinafter, a second embodiment of the present invention will be described by using FIG. 7. The second embodiment is an embodiment in which the importance is attached to a real-time image display by the display unit 110, and when the radiation image data and the image data for offset are renewed, an image display by the display unit 110 is immediately renewed. Incidentally, the schematic configuration of an X-ray imaging system (radiation imaging system) according to the second embodiment is given the following change only with respect to the X-ray imaging system according to the first embodiment illustrated in FIG. 1.

That is, the second image memory 106 for offset illustrated in FIG. 1 is integrated into the first image memory 105 for offset and is made into an image memory for offset, and the second switch SW2 illustrated in FIG. 1 is deleted. In this case, in the image memory for offset, both of the image data of the first image data for offset correction and the second image data for offset correction are stored. Further, in the second embodiment, the third switch SW3 illustrated in FIG. 1 is changed to the second switch SW2.

Figure 7:
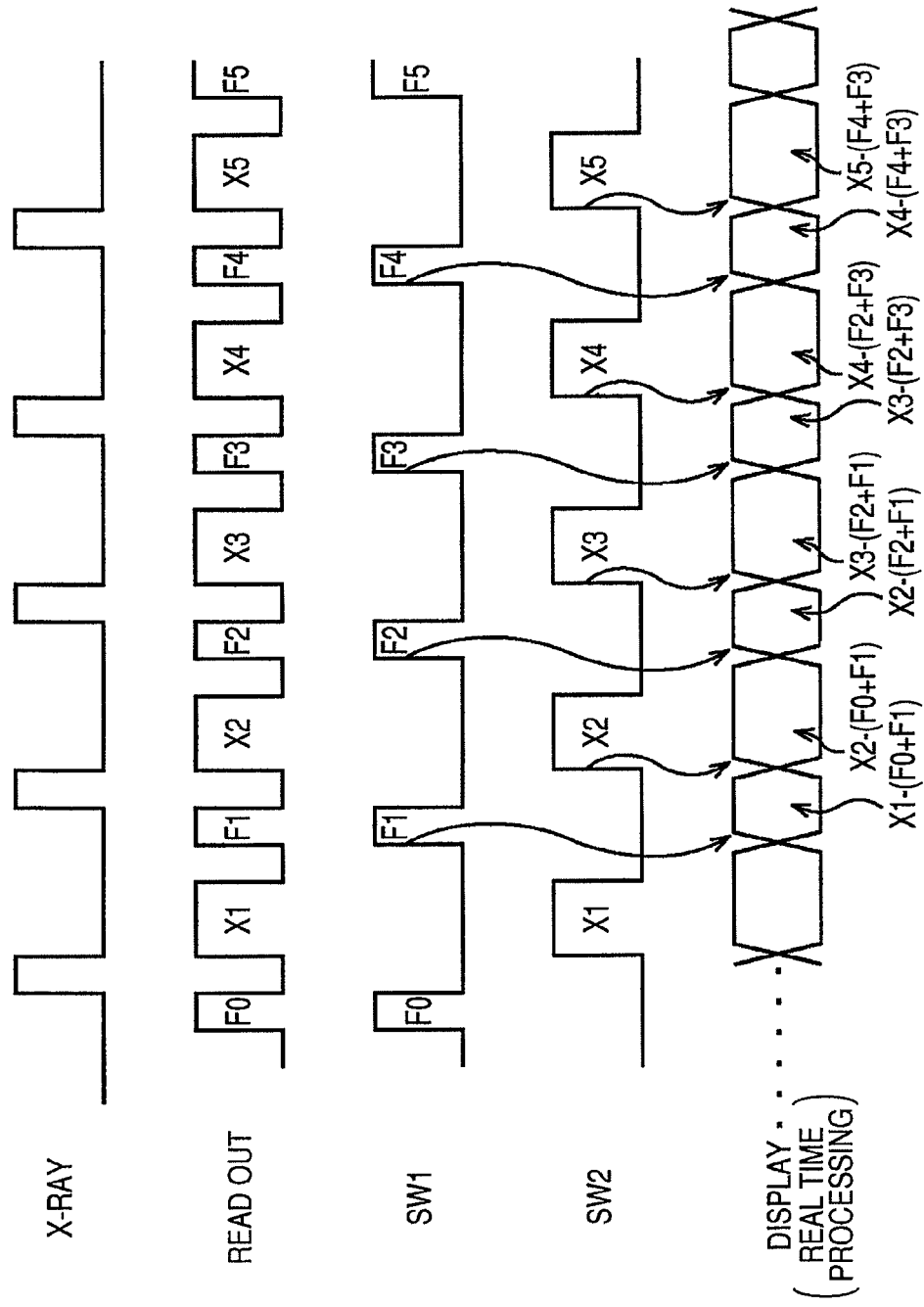
FIG. 7 is a timing chart illustrating the driving method of the X-ray imaging system according to a second embodiment.

FIG. 7 is a timing chart illustrating the driving method of the X-ray imaging system according to the second embodiment. In FIG. 7 are illustrated, in order from above, the X-ray irradiation from an X-ray generator 200, the read out at a read out circuit unit 104, each action of a first switch SW1 and a second switch SW2, and each timing of the display of the images in a display unit 110.

When the X-ray irradiation illustrated in FIG. 7 is performed and the radiographing of an object 300 is performed, the control unit 101 controls the driving circuit unit 103, and scans all the driving lines Vg1 to Vgm in order. As a result, from the read out circuit unit 104, radiation image data X1 of one frame portion of the whole area sensor 102 including the image data of the object 300 is output. At this time, the control unit 101 performs a control to turn on the second switch SW2, thereby to store the radiation image data X1 in a radiation image memory.

Subsequently, after the radiation image data X1 is output from the read out circuit unit 104, the control unit 101 controls a driving circuit unit 103, thereby to obtain the first image data for offset from a first pixel group inside the area sensor 102. In the present embodiment, an interlace scanning for driving the driving lines of odd rows only is performed. As a result, from the read out circuit unit 104, the image data based on the electric charges generated by a plurality of conversion elements of the pixels of odd rows which are a first pixel group is output as a first image data F1 for offset correction. At this time, the control unit 101 performs a control to turn on a first switch SW1, thereby to store a first image data F1 for offset correction in the above described image memory for offset according to the present embodiment.

Further, in the image memory for offset according to the present embodiment, a second image data FO for offset correction given an interlace scanning for driving the driving lines of even rows only which are a second image group and output from the read out circuit unit 104 is already stored. This second image data FO is output from the read out circuit unit 104 before the radiation image data X1 is output from the read out circuit unit 104.

The processing unit 108 synthesizes the first image data F1 for offset correction and the second image data FO for offset correction stored in the image memory for offset, thereby to generate image data (F0+F1) for offset correction of one image portion (one frame portion). Here, in the second embodiment, the processing unit 108 generates the above described imaged data (F0+F1) for offset of one image portion (one frame portion) by using the first real time image data F1 for offset correction output from the read out circuit unit 104.

An arithmetic operation unit 109 performs arithmetic operation processing such as subtraction by using the image data (F0+F1) for offset correction of one frame portion generated in real time in the processing unit 108, and displays the image data that has been subjected to the arithmetic operation processing in the display unit 110.

Next, when the X-rays are irradiated again and the radiographing of the object 300 is performed, the control unit 101 controls the driving circuit unit 103, and scans all driving lines Vg1 to Vgm in order. As a result, from the read out circuit unit 104, radiation image data X2 of one frame portion of the whole area sensor 102 including the image data of the object 300 is output. At this time, the control unit 101 performs a control to turn on a second switch SW2, thereby to store this radiation image data X2 in the radiation image memory.

At this time, the arithmetic operation unit 109 performs an arithmetic operation processing on the radiation image data X2 radiographed in real time by using the image data (F0+F1) for offset generated in an image synthesizing unit 108 for offset, and displays the image data subjected to the arithmetic operation processing in the display unit 110.

Subsequently, after the radiation image data X2 is output from the read out circuit unit 104, the control unit 101 controls the driving circuit unit 103, thereby to obtain the second image data for offset from a second pixel group inside the area sensor 102. In the present embodiment, the interlace scanning for driving the driving lines of even rows only is performed. As a result, from the read out circuit unit 104, the image data based on the electric charges generated at the conversion elements of the plurality of pixels of even rows which are the second pixel group is output as a second image data F2 for offset correction. At this time, the control unit 101 performs a control to turn on the first switch SW1, thereby to store this second image data F2 for offset correction in the above described image memory 106 for offset according to the present embodiment.

The processing unit 108 synthesizes the first image data F1 for offset correction and the second image data F2 for offset correction stored in the memories for offset, thereby to generate image data (F2+F1) for offset correction of one image portion (one frame portion). At this time, the processing unit 108 generates the above described image data (F2+F1) for offset correction of one image portion (one frame portion) by using the real time second image data F2 for offset correction output from the read out circuit unit 104.

The arithmetic operation unit 109 performs an arithmetic operation processing on the radiation image data X2 by using the image data (F2+F1) for offset correction of one image portion (one frame portion) generated in real time in the processing unit 108, thereby to display the image data subjected to the arithmetic operation processing in the display unit 110.

After that, similarly to the offset correction in the radiation image data X2, the offset correction of radiation image data X3 onward is performed.

According to the second embodiment, in addition to the effect of the first embodiment, and further, as compared to the case of the first embodiment illustrated in FIG. 4A, the radiation image data subjected to the offset correction can be displayed more in real time by the display unit 110.

Third Embodiment

Figure 8:
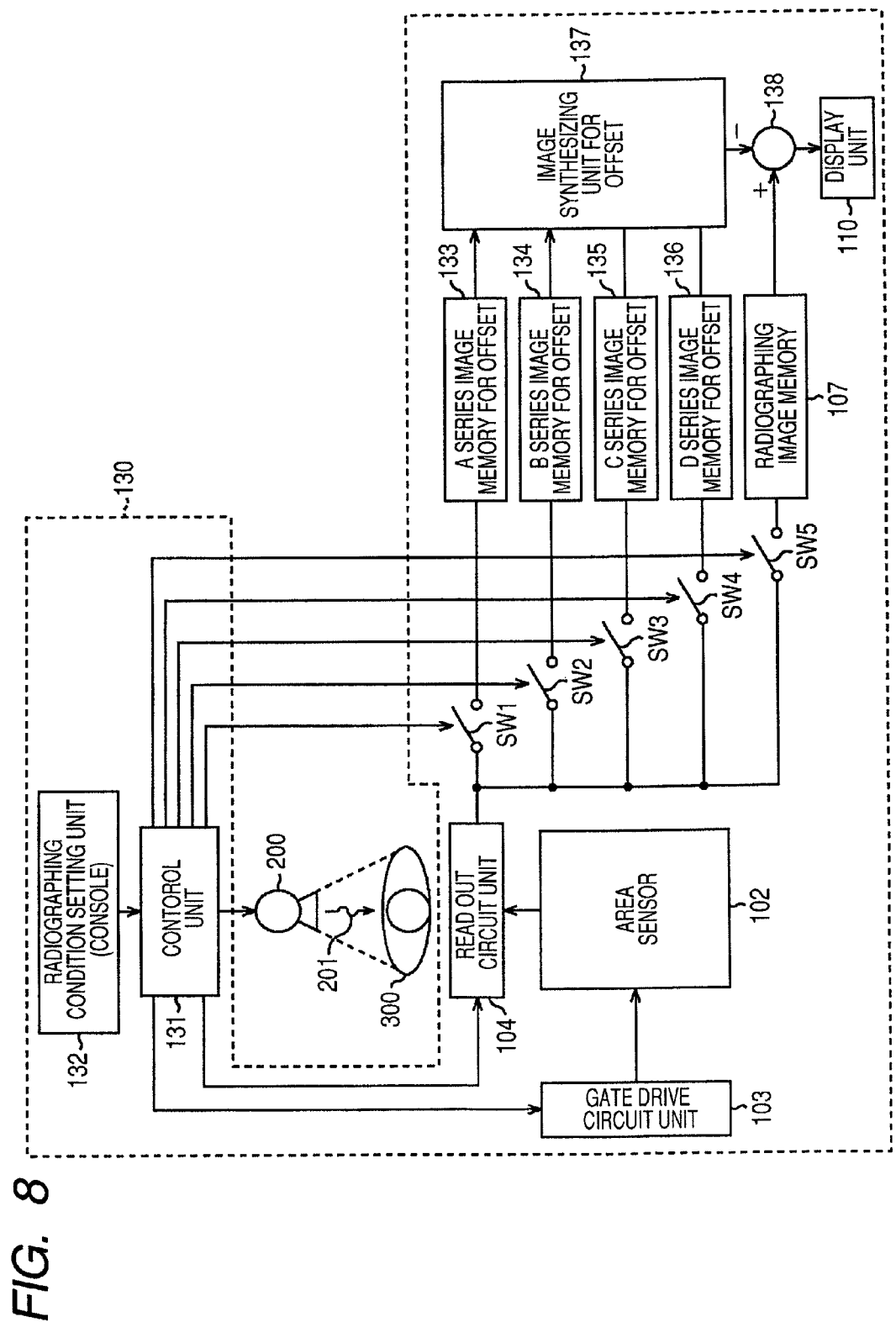
FIG. 8 is a schematic block diagram of the X-ray imaging system according a third embodiment.

Hereinafter, a third embodiment of the present invention will be described by using FIGS. 8, 9A, and 9B. FIG. 8 is a schematic block diagram of an X-ray imaging system (radiation imaging system) according to the third embodiment. The X-ray imaging system according to the present embodiment comprises an X-ray imaging apparatus 130 and an X-ray generator 200.

The X-ray imaging apparatus 130 in the third embodiment, similarly to the X-ray imaging apparatus 100 in the first embodiment, comprises an area sensor 102, a driving circuit unit 103, a read out circuit unit 104, a radiation image memory 107, and a display unit 110.

The X-ray imaging apparatus 130 is provided with image memories 133 to 136 by a total four systems of A system to D system as memories to store the partial image data for offset correction every pixel group used at the time of the offset correction. Corresponding to these image memories 133 to 136 and the radiation image memory 107, a switch group comprising a first SW1 to a fifth SW5 is configured.

Further, the present embodiment is provided with a radiographing condition setting unit 132 for performing the setting of radiographing conditions. The control unit 131, based on the setting of the radiographing condition setting unit 132, controls the actions of a driving circuit unit 103, a read out circuit unit 104, a first switch SW1 to a fifth switch SW5, and an X-ray generator 200.

In the third embodiment, by a control from the control unit 131, the driving circuit unit 103 can perform an interlace scanning of four line cycle in the gate lines Vg1 to VGm. Further, the control unit 131, according to the radiographing conditions set at the radiographing setting unit (in reality, an operating table) 132, decides the number of interlace scannings in the driving circuit unit 103. At this time, the control unit 131, depending upon the setting of the radiographing condition setting unit 132, may perform the scanning of the driving lines Vg1 to Vgm in order without performing the interlace scanning, thereby to obtain the image data for offset correction in the whole area sensor 102. Further, the control unit 131, according to the radiographing conditions set at the radiographing setting unit 132, performs a control to change a pulse period of the X-rays 201 radiated from the X-ray generator 200, its energy and its intensity.

In the third embodiment, in each of the image memories 133 to 136, the image data according to the conversion elements of the four line cycle of the area sensor 102 is stored basically. In the image synthesizing unit 137 for offset, the sets of partial image data for offset correction stored in each of the memories 133 to 136 are all synthesized, so that the image data for offset correction in the whole area sensor 102 is generated.

Next, the driving method of the X-ray imaging system according to the third embodiment will be described. FIGS. 9A and 9B are timing chart illustrating the driving method of the X-ray imaging system according to the third embodiment. Here, FIG. 9A illustrates an outline of the driving system of the X-ray imaging system according to the third embodiment, and FIG. 9B illustrates the detail of the driving method of the X-ray imaging system of the third embodiment with attention paid to the driving line scanning of the driving circuit unit 103.

Figure 9B:
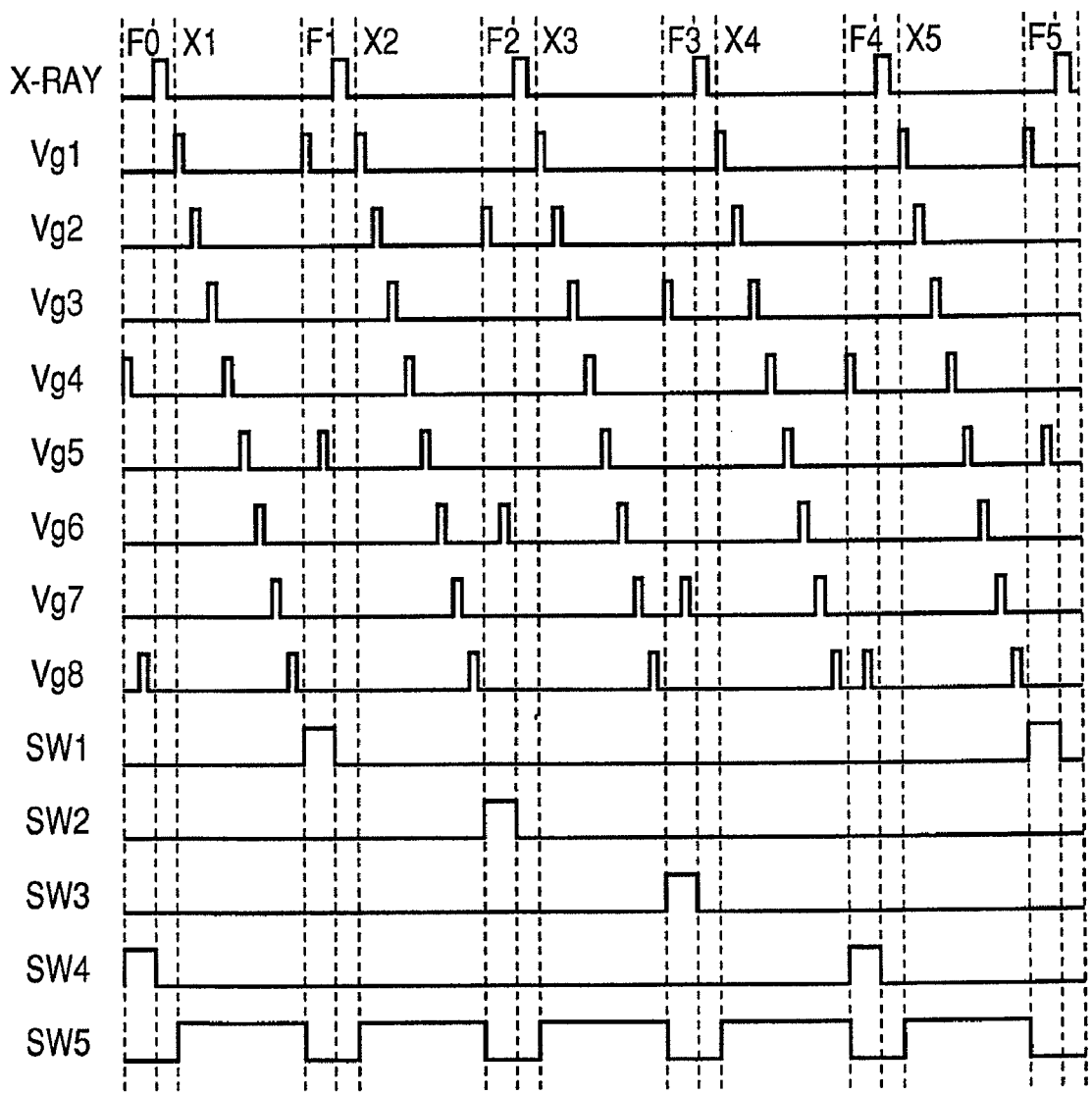
FIG. 9B is a timing chart illustrating the driving method of the X-ray imaging system according to the third embodiment.

In the examples illustrated in FIGS. 9A and 9B, the radiation image data of the whole area sensor 102 including the image data of the object 300 is output by driving all gate lines of each of the driving line Vg1 to Vgm one by one. On the other hand, the image data for offset correction per each pixel group is output to each of the image memories 133 to 136 with the driving lines driven in order one by one at the four line cycle.

The present embodiment may be configured such that the control unit 131 can change the number of driving lines of the interlace scanning when obtaining the image data for offset correction every pixel group by the radiographing conditions set in the radiographing setting unit 132. For example, the number of driving lines of the interlace scanning when obtaining the image data for offset correction every pixel group may be selected among one to four lines. By virtue of such a configuration, it is possible to select the most suitable radiographing speed and the most suitable image quality of the radiographed image according to the state of the object 300 and the area sensor 102.

Incidentally, in the embodiment, when the image data for offset correction is obtained per each pixel group, though the gate lines are read out in order one by one at the four line cycle, the present invention is not limited to this. For example, the gate lines may be scanned k pieces simultaneously. In this case, $k \geqq 1$, and moreover, 1/k is desirably an integer. Further, the driving circuit unit 103 enabling such a scanning can include a shift resister input with, though not illustrated, a start pulse, a shift clock, and an output enable signal.

According to the third embodiment, since the scanning of the gate lines for obtaining the image data for offset correction per each pixel group is performed at the four line cycle, in addition to the effect of the first embodiment, more prompt radiographing can be further realized. This third embodiment is effective particularly when the variance in time of the image data for offset is small and fluoroscopic radiographing of the child is required at a high speed.

Fourth Embodiment

Hereinafter, a fourth embodiment of the present invention will be described by using FIGS. 10 and 11. A schematic block diagram of an X-ray imaging system according to the fourth embodiment is the same as the X-ray imaging system according to the first embodiment illustrated in FIG. 1, and its detailed description thereof will be omitted.

Figure 10:
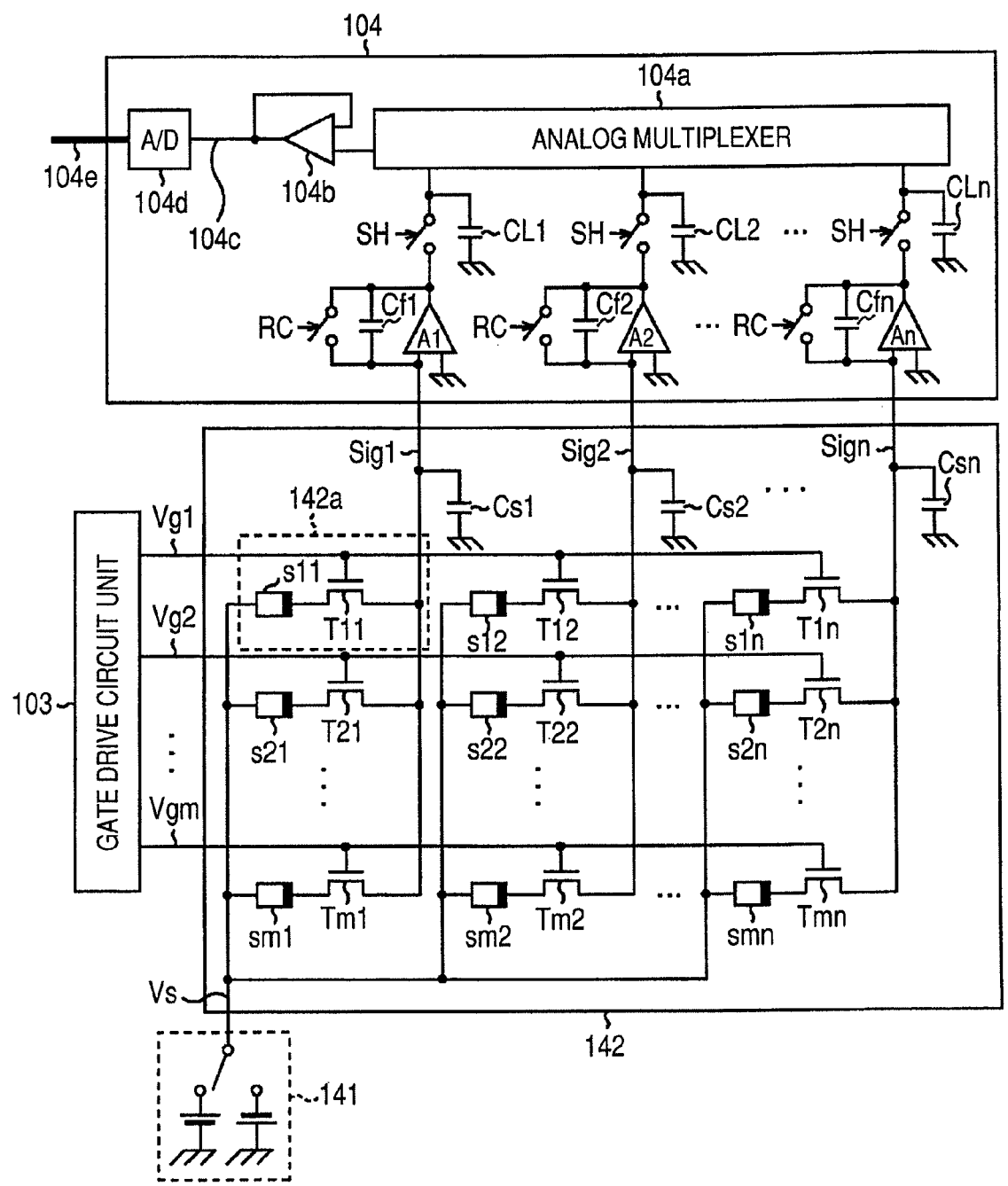
FIG. 10 is a schematic illustration illustrating the detailed configurations of the area sensor and the read out circuit unit of the X-ray imaging system (radiation imaging system) according to a fourth embodiment.

FIG. 10 is a schematic illustration illustrating the detailed configuration of an area sensor of the X-ray imaging system (radiation imaging system) and a read out circuit unit according to the fourth embodiment. Incidentally, a power source 141 illustrated in FIG. 10 is configured in a control unit 101.

Photoelectric conversion elements in the conversion elements S11 to Smn comprising a pixel 102a in the first embodiment illustrated in FIG. 2 are formed by a PIN type structure. In contrast to this, the photoelectric conversion elements in the conversion elements S11 to Smn comprising a pixel 142a in the fourth embodiment illustrated in FIG. 10 are formed by MIS type structure. Further, each pixel 142a of the area sensor 142 comprises amorphous silicon as a main material. In the case of the MIS type photoelectric conversion element, the offset correction according to the present invention is particularly effective.

Figure 11:
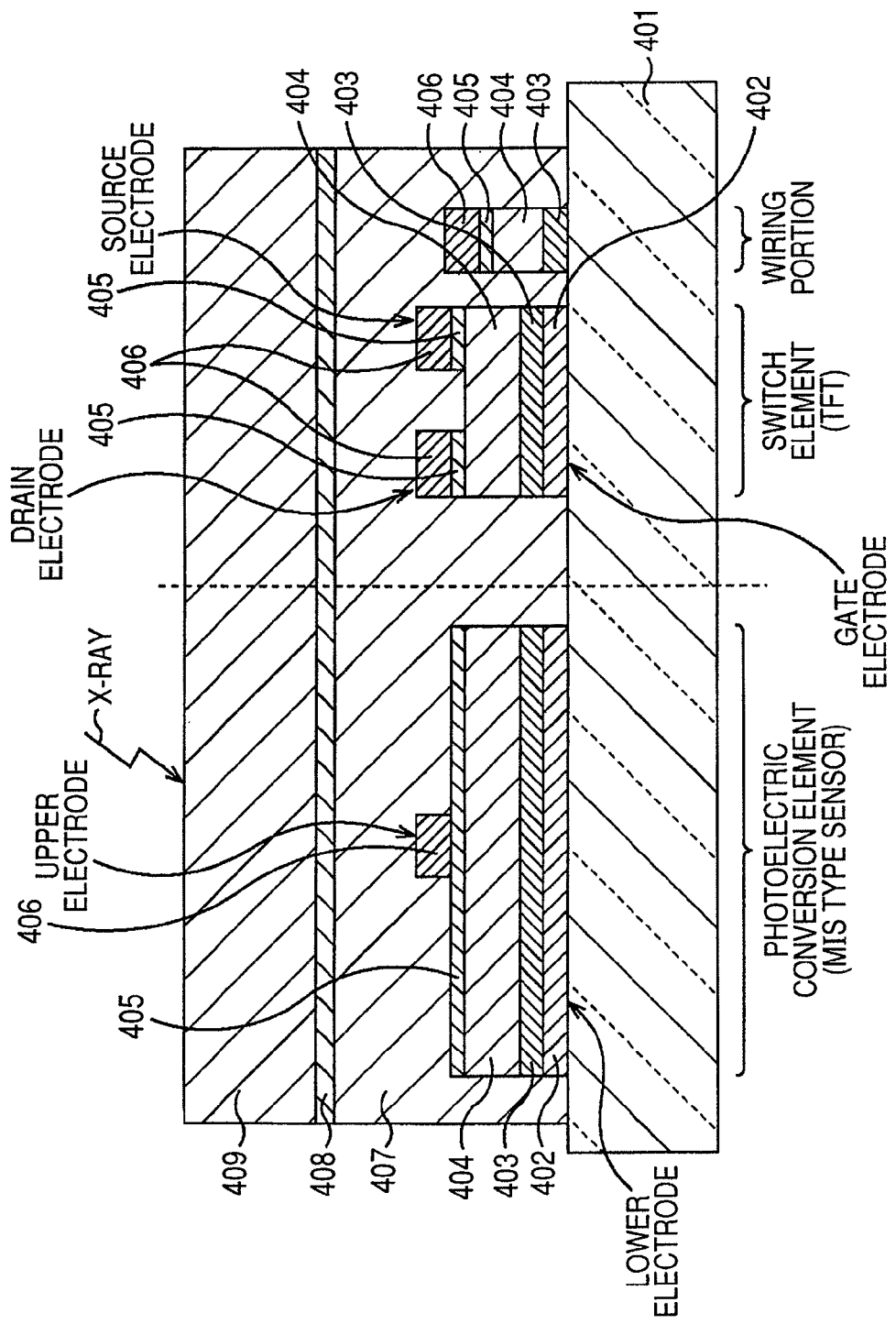
FIG. 11 is a schematic sectional view of the pixel comprising the area sensor in the X-ray imaging system according to the fourth embodiment.

FIG. 11 is a schematic block diagram of the pixel 142a comprising the area sensor 142 in the X-ray imaging system according to the fourth embodiment.

As illustrated in FIG. 11, the pixel 142a comprises a first conductive layer 402, an insulating layer 403, a semiconductor layer 404, an n-type semiconductor layer 405, a second conductive layer 406, a protective layer 407, an adhesive layer 408, and a phosphor layer 409 formed in order on an insulating substrate such as a glass substrate 201. Here, the semiconductor layer 404 and the n-type semiconductor layer 405 are formed, for example, by amorphous silicon as main materials. Further, the insulating layer 403 and the protective layer 407 are formed, for example, by amorphous silicon nitride film.

The photoelectric conversion elements S11 to Smn of the MIS type structure comprises a lower electrode composed of the first conductive layer 402, an upper electrode composed of the second conductive layer 406, and the insulating layer 403, the semiconductor layer 404, and the n-type semiconductor layer 405 provided between these electrodes.

The switch elements T11 to Tmn comprise a gate electrode composed of the first conductive layer 402, a source electrode and a drain electrode composed of the second conductive layer 406, and the insulating layer 403, the semiconductor layer 404, and the n-type semiconductor layer 405 between the gate electrode and the source or drain electrode.

Further, a wiring portion in the pixel 142a comprises the insulating layer 403, the semiconductor layer 404, an n-layer 405, and a second conductive layer 406, which are laminated in order on the glass substrate 401.

In FIG. 11, since an example is illustrated in which the X-ray imaging apparatus is configure, the phosphor layer 409 is arranged on the protective layer 407 through the adhesive layer 408. In this case, as the phosphor layer 409, for example, gadolinium system materials or CsI (cesium iodide) is used as main materials.

The first and fourth embodiments have been such that, as the conversion element for converting the radiation into the electric charges, the wavelength converter such as phosphor and the photoelectric conversion element are included, whereas, as a photoelectric conversion element, the PIN type structure and the MIS type structure composed of amorphous silicon have been applied. However, another structure as illustrated below may be applicable.

That is, as the conversion element, it is possible to apply the photoelectric conversion element of a so-called direct conversion type which absorbs radiation such as X-rays and directly converts the radiation into electric charges. As the conversion element of the direct conversion type in this case, the element can include, for example, amorphous selenium, gallium arsenide, gallium phosphorus, lead iodide, mercuric iodide, and CdTe or CdZnTe as main materials.

Further, the switch element in the area sensor can include, in addition to amorphous silicon, for example, polysilicon and organic materials. Further, in the first to fourth elements, the driving circuit unit 103 is supposed to comprise using an integrated circuit comprising crystal silicon. However, the driving circuit unit 103 may comprise a shift resistor with amorphous silicon or poly silicon used as materials. In such a configuration, there is no need to separately provide the driving circuit unit 103, and this is effective for the reduction in cost.

Fifth Embodiment

Figure 12:
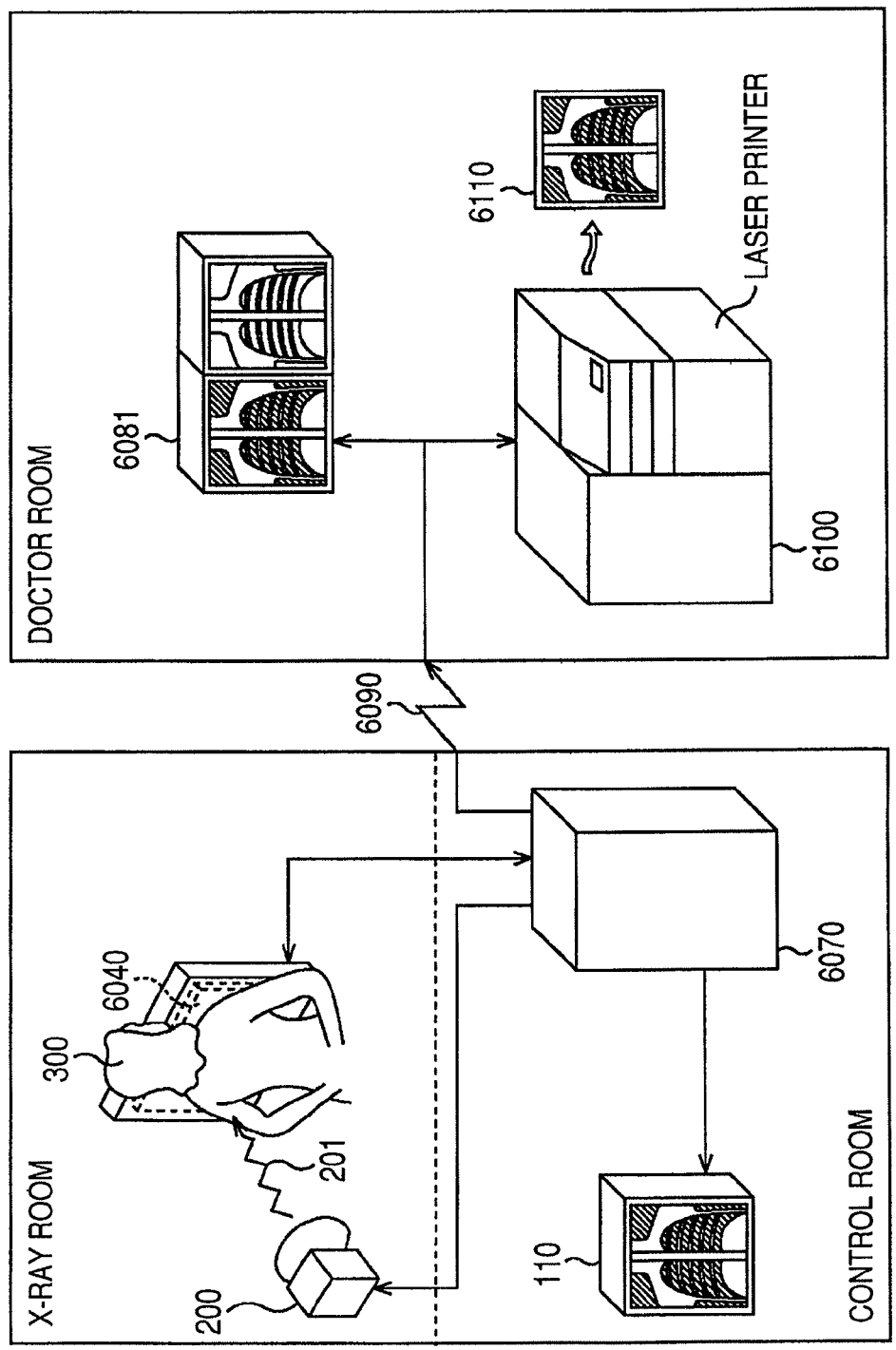
FIG. 12 is a schematic block diagram of the X-ray imaging system (radiation imaging system) according to a fifth embodiment.

Hereinafter, a fifth embodiment of the present invention will be described by using FIG. 12. FIG. 12 is a schematic block diagram of an X-ray imaging system (radiation imaging system) according to a fifth embodiment.

The area sensor 102 (or 142), the driving circuit unit 103, and the read out circuit unit 104 in the first to fourth embodiments are provided, for example inside an image sensor 6040. Further, other components such as the control unit 101 (or 131), memories of various types, processing unit 108 (or 107), and arithmetic operation unit 109 (or 138) in the first and fourth embodiments are provided, for example, inside an image processor 6070. Further, in the image processor 6070, the image processing according to purpose is executed.

Further, the image processor 6070 transmits the radiation image data subjected to an offset correction to a film processor 6010 through a communication line 6090 according to need. In the film processor 6100, the radiation image data is displayed in a display 6081 or recorded in a film 6110.

Each of the means of FIG. 1 and FIG. 8 configuring the radiation imaging system according to each of the above described embodiments and each step of FIG. 5 illustrating the driving method of the radiation imaging system can be realized by operating a program stored in RAM and ROM of a computer. This program and a storage medium readable by the computer are included in the present invention.

Specifically, the program is recorded in the storage medium such as CD-ROM or is provided to the computer through transmission media of various types. As the storage medium for recording the program, in addition to CD-ROM, a flexible disc, hard disc, magnetic tape, magneto-optic disc, and non-volatile memory card can be used. On the other hand, as the transmission medium of the program, a communication media in a computer network (LAN, WAN such as an internet, radio communication network and the like) system for propagating and supplying program information as a carrier wave can be used. Further, as the communication media at this time, a wire circuit such as an optical fiber and a wireless circuit can be included.

Further, not only the case where the function of the radiation imaging system according to each embodiment can be realized by executing the program provided to the computer, but also the case where, in collaboration with an OS (operating system) in which the program is working in the computer or other application soft, the function of the radiation imaging system according to each embodiment is realized in addition to the case where all or the part of the processing of the provided program is performed by a function extension board and a function extension unit of the computer, thereby to realize the function of the radiation imaging system according to each embodiment can include such program in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-190896, filed Jul. 11, 2006, which is hereby incorporated by reference herein in its entirety.

What is claimed is:

1. A radiation imaging apparatus comprising:
an area sensor arranged with pixels in a matrix, each pixel having a conversion element for converting incident radiation into an electric signal;
a driving circuit unit for applying a driving signal to a driving line and driving a plurality of the pixels connected in common to the driving line;
a read out circuit unit reading out the electric signal from the pixel driven by the driving circuit unit and outputting the electric signal as image data;
a processing unit for executing a process for producing image data for correction based on partial image data for correction, wherein the partial image data for correction is read out by the read out circuit unit as an electric signal from one or more of the plurality of pixels in the area sensor without the incident radiation while the one or more of the pixels are driven by the driving circuit unit and the other pixels are not driven by the driving circuit unit, and then outputted from the read out circuit unit; and
an arithmetic operation unit for subjecting radiation image data to an arithmetic operation processing using the image data for correction, wherein the radiation image data is read out by the read out circuit unit as an electric signal from the pixels driven by the driving circuit unit based on the incident radiation, and then outputted from the read out circuit unit.

2. The radiation imaging apparatus according to claim 1, wherein the processing unit synthesizes first partial image data for correction output from the read out circuit unit after the processing unit reads out the electric signal in a state in which the radiation is not incident from the pixel included in a first pixel group partially driven by the driving circuit unit, after the radiation image data is output, and second partial image data for correction output from the read out circuit after the processing unit reads out the electric signal in a state in which the radiation is not incident from the pixel included in a second pixel group different from the first pixel group partially driven by the driving circuit unit, before the radiation image data is output, thereby to generate the image data for correction.

3. The radiation imaging apparatus according to claim 2, wherein the first pixel group comprises a plurality of pixels connected to the odd-numbered driving lines among the plurality of the pixels inside the area sensor, and the second pixel group comprises the plurality of pixels connected to the even-numbered driving lines among the plurality of the pixels inside the area sensor.

4. The radiation imaging apparatus according to claim 3, wherein the first pixel group comprises the plurality of pixels connected to the odd-numbered driving lines given an interlace scanning by the driving circuit unit and the second pixel group comprises the plurality of pixels connected to the even-numbered driving lines given the interlace scanning by the driving circuit unit.

5. The radiation imaging apparatus according to claim 4, further comprising radiographing condition setting means for performing the setting of radiographing conditions, wherein, according to the radiographing conditions set by the radiographing condition setting means, the number of lines of the driving lines performing the interlace scanning is controlled.

6. The radiation imaging apparatus according to claim 5, wherein, according to the radiographing conditions set by the radiographing condition setting means, a pulse period, an energy, and an intensity of the radiation can be changed.

7. The radiation imaging apparatus according to claim 2, wherein the processing unit, when synthesizing the first partial image data for correction and the second partial image data for correction, performs the synthesis by applying a specific coefficient to both or either of them.

8. The radiation imaging apparatus according to claim 1, wherein the arithmetic operation means performs a subtraction as the arithmetic operation processing.

9. The radiation imaging apparatus according to claim 1, wherein, every time the radiation image data is output, the partial image data for correction is output from the read out circuit unit.

10. The radiation imaging apparatus according to claim 1, wherein the pixel comprises the conversion element and a switch element for transferring the electric signal of the conversion element on an insulating substrate, and control electrodes of the switch elements of a plurality of pixels arranged in a row direction are connected in common to the driving lines, and one electrode among main electrodes of the switch elements of the plurality of pixels arranged in a column direction is connected in common to the signal line, and another electrode among main electrodes of the switch elements is connected to the conversion element, and the signal line is connected to the read out circuit unit, and the conversion element includes a photoelectric conversion element comprising amorphous silicon as a main material and a wavelength converter for converting the radiation into a light perceptible by the photoelectric conversion element.

11. The radiation imaging apparatus according to claim 1, wherein the driving circuit unit comprises a shift resistor input with a start pulse, a shift clock and an output enable signal.

12. A radiation imaging system, comprising:
a radiation generator for generating radiation; and
a radiation imaging apparatus according to claim 1,
wherein the radiation generated by the radiation generator is incident upon the area sensor.

13. A driving method of a radiation imaging apparatus, which comprises an area sensor arranged with pixels in a matrix, each pixel having a conversion element for converting incident radiation into an electric signal, a driving circuit unit for applying a driving signal to a driving line and driving a plurality of the pixels connected in common to the driving line, and a read out circuit unit reading out the electric signal from the pixel driven by the driving circuit unit and outputting the electric signal as image data, comprising:

a step of outputting radiation image data from the read out circuit unit, wherein the radiation image data is read out by the read out circuit unit as an electric signal from pixels driven by a driving circuit unit based on the incident radiation, and then outputted from the read out circuit unit;

a step of outputting partial image data for correction from the read out circuit unit, wherein the partial image data for correction is read out by the read out circuit unit as an electric signal from one or more of the plurality of pixels in the area sensor without the incident radiation while the one or more of the pixels are driven by the driving circuit unit and the other pixels are not driven by the driving circuit unit, and then outputted from the read out circuit unit;

a step of generating image data for correction by using the partial image data for correction; and a step of performing an arithmetic operation processing on the radiation image data by using the image data for correction.

\* \* \* \* \*